US006262989B1

(12) United States Patent
Gemar et al.

(10) Patent No.: US 6,262,989 B1
(45) Date of Patent: Jul. 17, 2001

(54) APPARATUS AND METHOD FOR PROVIDING DIFFERENT QUALITY OF SERVICE CONNECTIONS IN A TUNNEL MODE

(75) Inventors: Jeff R. Gemar, Superior; Warner B. Andrews, Jr., Boulder, both of CO (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/044,381

(22) Filed: Mar. 18, 1998

(51) Int. Cl.[7] .................................................. H04L 12/28
(52) U.S. Cl. .......................................... 370/412; 370/468
(58) Field of Search ..................................... 370/398, 395, 370/412, 396, 418, 229, 234, 230, 235, 468

(56) References Cited

U.S. PATENT DOCUMENTS

| 5,241,536 | 8/1993 | Grimble et al. . |
| 5,394,397 | 2/1995 | Yanagi et al. . |
| 5,533,020 | 7/1996 | Byrn et al. . |
| 5,889,779 | * 3/1999 | Lincoln ................................ 370/398 |

FOREIGN PATENT DOCUMENTS

97/42735    11/1997    (WO) .

OTHER PUBLICATIONS

Brian L. Mark, "Large Capacity Multiclass ATM Core Switch Architecture", Interactive Session 3—Systems Technology and Engineering, p. 417–423.

* cited by examiner

Primary Examiner—Chau Nguyen
Assistant Examiner—Alexander O. Boakye
(74) Attorney, Agent, or Firm—Foley & Lardner

(57) ABSTRACT

A traffic manager system coupled to a communication system for scheduling transmission of data associated with a plurality of connections in the communication system. The traffic manager includes a schedule table, a global priority queue, and a scheduler. The schedule table includes a plurality of slot locations, each having a least one tunnel entry. The scheduler is coupled to the schedule table and the global priority queue. The global priority queue has a tunnel level associated with the tunnel entry of the slot. The scheduler processes the slot locations in the schedule table and sets a tunnel active in response to processing the tunnel entry. The scheduler selects at least one connection from the tunnel level when active, which thus provides for the selection of connections from a plurality of service classes. As such, the scheduler allows per connection shaping in the tunnel mode. The scheduler, thus, maximizes communication bandwidth.

20 Claims, 15 Drawing Sheets

APPARATUS AND METHOD FOR PROVIDING DIFFERENT QUALITY OF SERVICE CONNECTIONS IN A TUNNEL MODE

CROSS REFERENCE TO RELATED APPLICATIONS

The present application is related to U.S. application Ser. No. 08/759,057 now U.S. Pat. No. 5,889,779, filed Dec. 2, 1996, by Lincoln, entitled "Scheduler Utilizing Dynamic Schedule Table." The present application is also related to U.S. application Ser. No. 09/044,384, filed on an even date herewith by Germar, et al. entitled "Apparatus and Method for Scheduling Multile and Simultaneous Traffic in a Communication System" and assigned to the Assignee of the present invention.

FIELD OF THE INVENTION

The present invention relates to a method and to an apparatus for transferring information through a communication medium. More particularly, the present invention relates to a method and to an apparatus for scheduling the transmission of information across connections in a communication system.

BACKGROUND OF THE INVENTION

Various systems have been adopted to carry digitally-encoded signals for communication applications, such as, telephone, video, and data services. These systems are often connection-oriented packet mode transmission systems, such as, asynchronous transfer mode (ATM) systems, frame relay systems, X.25 systems, or other transmission systems. Connection-oriented systems (e.g., ATM systems) have been employed in private and public communication systems or networks (e.g., wide area networks (WANs)) to transfer packetized signals (e.g., data cells or protocol data units) across communication lines, such as, telephone lines, cables, optical fibers, air waves, satellite links, or other communication media.

As an example, the ATM system transfers the data cells or units across the ATM system via connections or channels. The data cells can represent voice, sound, video, graphics, data, or combinations thereof for use in computing or communication applications. The connections can be part of a single physical link carrying a number of logical connections or be a single isolated path. The connections are often classified as either virtual channel connections (VCC), or virtual path connections (VPC) and either permanent virtual connections (PVC), or switched virtual connections (SVC). Connections are generally defined by a source and a destination for the data cell.

ATM systems or networks are generally utilized to support the integration of high quality voice, video, and high speed data traffic which can have specific conformance and quality of service (QOS) requirements. A scheduler is employed to properly select connections for transmission in accordance with operational parameters, such as, QOS requirements. The scheduler organizes transmission of data cells associated with the connections to guarantee QOS requirements and protocol conformance at the network ingress point as well as to maximize bandwidth for the communication system.

ATM systems can utilize at least four types of service categories or modes of traffic for transmission of data cells on connections. These four types include the constant bit rate (CBR) mode, the variable bit rate (VBR) mode, the unspecified bit rate (UBR) mode, and the available bit rate (ABR) mode. Each of these modes have somewhat different transmission protocol requirements. For example, the CBR mode requires that a connection be able to send a specific number of cells or bits per second; the CBR mode must have a set end-to-end bandwidth. The CBR mode is often utilized for data sources, such as, voice or video circuits which are susceptible to cell delay variations (CDV). The VBR mode often utilizes a "single leaky bucket" algorithm (e.g., virtual scheduling algorithm) or "dual leaky bucket" algorithm. Although the VBR mode has somewhat more flexible timing requirements than the CBR mode, the VBR mode must meet timing requirements dictated by the single or dual bucket algorithms. The ABR mode requires the sending of data cells in response to feedback from the network.

To appropriately supply and maximize the effectiveness of the transmission of the CBR, UBR, ABR, and VBR modes of traffic on the network, a scheduler controls a segmentation coprocessor (e.g., segmentation and reassembly unit) to direct communication of data cells or data protocol units on the connections. Generally, the scheduler attempts to select particular connections for transmission at particular times to guarantee conformance to traffic contracts and to QOS at network ingress points. This selection process, or scheduling, selects various connections for transmission based upon operational parameters associated with each connection, with feedback from the network, and with traffic mode timing requirements.

Scheduling a large number of connections with particular timing and communication criteria can lead to complex scheduling problems. For example, various connections can need a particular capacity from the network, and the availability of the particular capacity can be impinged by congestion across the network. These scheduling problems can be compounded by the specific requirements of CBR mode, VBR mode, UBR mode, and ABR modes of traffic.

Traditional network scheduling algorithms, such as, Token Ring and Ethernet utilize fairly simplified scheduling algorithms. The algorithms are typically based upon transmission schemes wherein each member of the network gets a fair share of the network bandwidth. These systems cannot handle QOS requirements or the four categories (e.g., CBR mode, VBR mode, UBR mode, and ABR mode) of traffic for ATM systems.

Prior schedulers utilized in ATM systems access a fixed size schedule table to assist time scheduling of connections. The fixed schedule table is comprised of slots, each of which is assigned to particular connections. The scheduler processes each slot one-by-one and transmits the connection assigned to the slot being processed to the network. These prior schedulers are somewhat inflexible and prioritize CBR and VBR modes traffic. Further, the fixed schedule table requires that the CBR modes of traffic be sent a fixed rate or a harmonic of a fixed rate. Further still, these prior schedulers often must send idle cells to maintain the drain rate for the connection.

Other prior schedulers utilize a first-in, first-out (FIFO) memory and a timer (e.g., hardware units) to appropriately send connections across the network. However, the number of hardware units is limited by circuit size design criteria and cannot be dynamically allocated as bandwidth becomes available. Each FIFO and timer must be dedicated to a particular rate of transmission. Therefore, the rates of transmission are limited. Additionally, these prior schedulers cannot prioritize VBR and CBR modes of traffic.

U.S. patent application Ser. No. 08/759,057 filed Dec. 2, 1996, by Lincoln, entitled "Scheduler Utilizing Dynamic Schedule Table" discloses a communication system which dynamically manages and prioritizes modes of traffic. The communication system can be arranged as an asynchronous transfer mode (ATM) system which can efficiently handle the CBR mode of traffic, the VBR mode of traffic, the UBR mode of traffic, and the ABR mode of traffic. Further, both the CBR mode of traffic and the VBR mode of traffic can be handled on a dynamic basis.

Conventional schedulers do not simultaneously support different quality of service connections (e.g., UBR, VBR, ABR) in a tunnel mode. For example, a tunnel mode is utilized to share a portion of the fixed maximum bandwidth among a number of connections. "Tunnelling" underneath the fixed maximum bandwidth is achieved by assigning an arbitrary maximum bandwidth to a group of connections each of which has an individual service contract. The sum of the bandwidth of the feature allows users or customers to advantageously create a network overlying the service providers (e.g., telephone companies) network). Conventional systems only allow UBR connections to utilize a tunnel mode. UBR connections cannot flexibly absorb excess bandwidth and must be processed in a roundrobin fashion.

Thus, there is a need for a scheduler which can support different quality of service connections in a tunnel mode. Additionally, there is a need for a scheduler for an asynchronous transfer mode (ATM) system which can support different service connections (e.g., the VBR mode of traffic and the ABR mode of traffic) within the same tunnel without exceeding tunnel bandwidth. Further still, there is a need for a scheduler which can handle frame relay and ATM service, along with different quality of service connections. As such, use of a fixed maximum bandwidth is maximized.

SUMMARY OF THE INVENTION

The present invention relates to a traffic manager system coupled to a communication system for scheduling transmission of data associated with a plurality of connections in the communication system. The traffic manager includes a schedule table, a global priority queue, and a scheduler. The schedule table includes a plurality of slot locations, each having a least one tunnel entry. The scheduler is coupled to the schedule table and the global priority queue. The global priority queue has a tunnel level associated with the tunnel entry of the slot. The scheduler processes the slot locations in the schedule table and sets a tunnel active in response to processing the tunnel entry. The scheduler selects at least one connection from the tunnel level when active, which thus provides for the selection of connections from a plurality of service classes. As such, the scheduler allows per connection shaping in the tunnel mode. The scheduler, thus, maximizes communication bandwidth.

The present invention still further relates to a traffic manager system coupled to a communication system for scheduling transmission of data associated with a plurality of connections in the communication system. The traffic manager includes a schedule table, a global priority queue, and a scheduler. The schedule table includes a plurality of slot locations, each having at least one tunnel entry. The scheduler is coupled to the schedule table and the global priority queue. The global priority queue has a tunnel level associated with the tunnel entry of the slot. The scheduler processes the slot locations in the schedule table and sets a tunnel active in response to processing the tunnel entry. The scheduler selects at least one connection from the tunnel level when active, which thus provides for the selection of connections from any of a variable bit rate (VBR) connection and an available bit rate (ABR) connection. As such, the scheduler allows per connection shaping in the tunnel mode. The scheduler, thus, maximizes communication bandwidth.

The present invention still further relates to a communication system including a control memory and a scheduler. The control memory includes a global priority queue and a connection state data structure. The global priority queue includes a plurality of tunnel levels defining a plurality of connections from a plurality of service classes. The connection state data structure includes particular bit rate mode parameters for the connection. The scheduler is coupled to the control memory. The scheduler schedules a plurality of connections from the plurality of tunnel levels to select a connection for eventual transmission. The scheduler dynamically reschedules the connection in response to a timing parameter and the particular bit rate mode parameters for the connection.

The present invention still further relates to a method of scheduling connections for transmission of data on a communication network. In the method, the scheduler first accesses a slot in a schedule table and retrieves connection information associated with a tunnel connection. Then, the scheduler places the connection information in a priority queue. The priority queue has a tunnel level associated with the tunnel connection, which is from one of a plurality of service classes. Finally, the scheduler processes the tunnel level to communicate information associated with the tunnel connection. In the present application the term communicate refers to any of the following: receive, provide, transmit, obtain, send, input, output, or convey.

According to one exemplary aspect of the present invention, a scheduler provides a plurality of tunnels. one of the tunnels provides for XBR tunneling, which allows for the scheduler to direct different quality of service (e.g., VBR, ABR) to the tunnel, without exceeding bandwidth. The "X" in XBR suggests the scheduler's enhanced capability of handling multiple quality of service modes. The use of XBR tunneling allows secondary shaping of connections to maximize the use of bandwidth associated with a tunnel.

According to yet another exemplary aspect of the present invention, a scheduler utilizes a single bucket or dual bucket algorithm to dynamically schedule connections utilizing variable bit rate modes of traffic. The scheduler dynamically places connections in future slots in the schedule table and responds to variable bit rate mode parameters and timing parameters.

In accordance with still further exemplary aspects of the present invention, dynamic rate scheduling with fine granularity for ABR modes of traffic can be achieved by adjusting the rate for a connection in response to feedback. The I and L parameters associated with a leaky bucket algorithm can be adjusted to change the rate for a connection for VBR modes of traffic. Statistical multiplexing can be achieved for VBR and APR modes of traffic by bursting connections to the extent allowed by L1 and L2 parameters associated with the dual bucket algorithm to recover from periods during which the connections were not allowed to be transmitted. A VBRC algorithm can also be utilized which relies on a cell loss priority parameter (CLP). The scheduler can also schedule connections in accordance with a minimum cell rate (MCR) priority parameter and a minimum cell rate (MCR) limit parameter. The scheduler can also be modified to handle packets of data which are not of fixed size.

BRIEF DESCRIPTION OF THE DRAWINGS

The present invention will be described herein with reference to the accompanying drawings wherein like numerals denote like elements and.

DETAILED DESCRIPTION OF THE PREFERRED EMBODIMENTS

Figure 1:
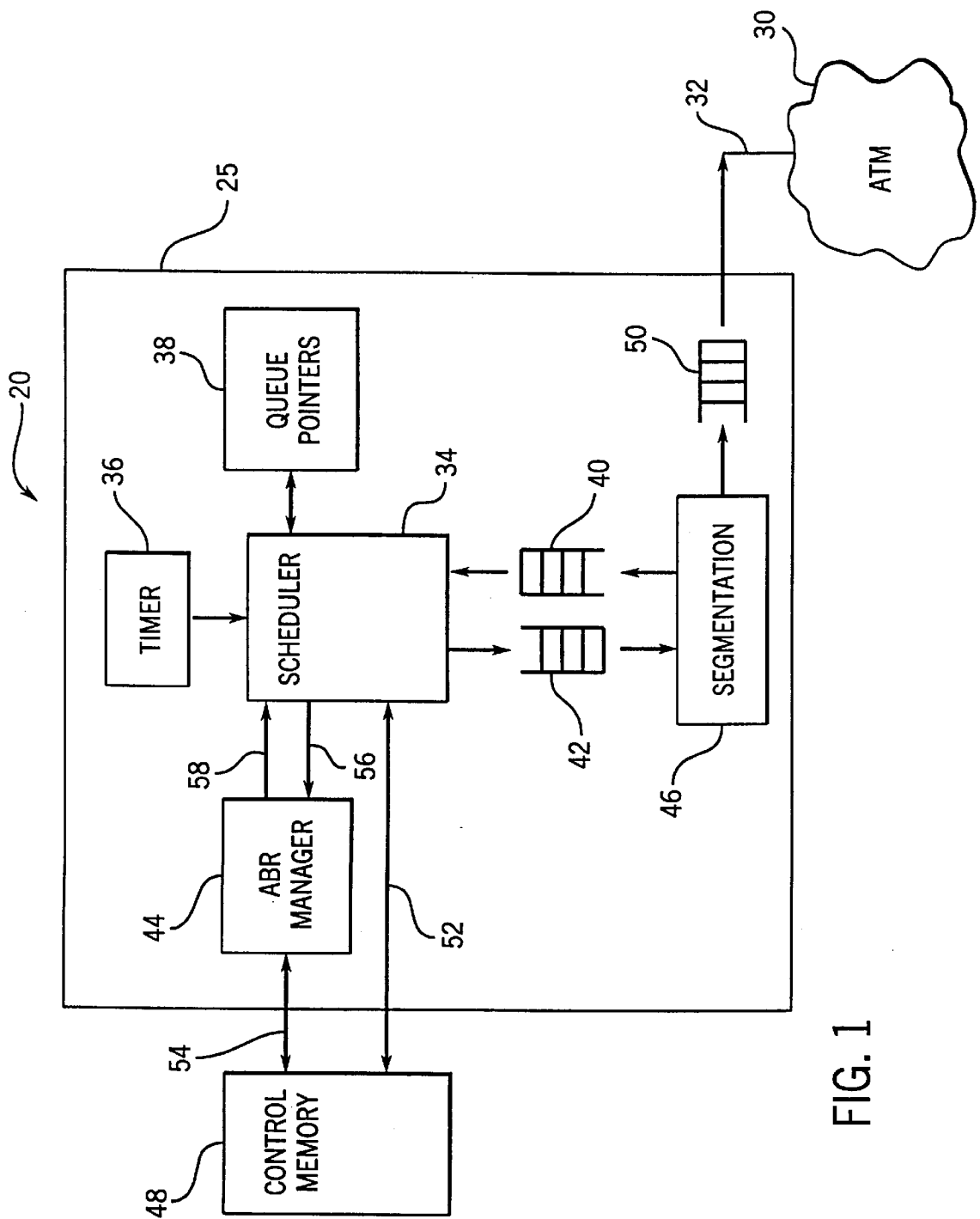
FIG. 1 is a schematic block diagram of a traffic class manager system coupled to an asynchronous transfer mode communication system and a control memory in accordance with an exemplary embodiment of the present invention.

With reference to FIG. 1, a communication system 20 includes a traffic manager system or unit 25 coupled to an ATM system or network 30 by a communication line 32. Unit 25 includes a scheduler 34, a timer 36, a global priority queue 38, a start FIFO memory 40, a schedule FIFO memory 42, an available bit rate (ABR) manager 44, a segmentation unit 46, and a transmit FIFO memory 50. Scheduler 34 of unit 25 is coupled to a control memory 48 via bus 52.

Control memory 48 is coupled to ABR manager 44 of unit 25 by a bus 54. Scheduler 34 is coupled to timer 36, global priority queue 38, start FIFO memory 40, schedule FIFO memory 42, and ABR manager 44. Scheduler 34 is coupled to ABR manager 44 by a control bus 56 and by a control bus 58. Segmentation unit 46 is coupled to start FIFO memory 40, schedule FIFO memory 42, and transmit FIFO memory 50. Transmit FIFO memory 50 is coupled to communication line 32.

Control memory 48 can be any memory unit, such as, a semiconductor memory or other storage facility. Queue 38 is preferably a semiconductor memory (e.g., register or static random access memory) device integrated with scheduler 34 for fast transfer of information. Unit 25 is preferably integrated on a single semiconductor substrate, including processing units, state machines, registers, and other circuits for implementing the functions and operations of scheduler 34, timer 36, global priority queue 38, start FIFO memory 40, schedule FIFO memory 42, ABR manager 44, segmentation unit 46, and transmit FIFO memory 50.

Traffic manager unit 25 preferably provides data packets or data cells as protocol data units (PDU) to ATM network 30. In general, scheduler 34 is a state machine which responds to timing signals from timer 36, control signals from ABR manager 44 across control bus 58, connection information and operational parameters for each connection stored in control memory 48, and connection information in start FIFO memory 40 to place connection information in global priority queue 38. Scheduler 34 selects the highest priority connection information in queue 38 and places that information in schedule FIFO memory 42 for eventual transmission through network 30.

Segmentation unit 46 receives the connection information stored in schedule FIFO memory 42. Segmentation unit 46 utilizes the connection information to place data cells associated with the connection information in transmit FIFO memory 50. The data cells are transmitted from FIFO memory 50 to line 32 and then to network 30. Segmentation unit 46 generally organizes the data cells into protocol data units (PDUs) for transmission on the network 30.

Scheduler 34 can also directly place connection information from control memory 48 into schedule FIFO memory 42. For example, scheduler 34 places connection information for the CBR mode of traffic directly from memory 48 to FIFO memory 42 without accessing queue 38. In this way, scheduler 34 ensures that the CBR mode of traffic is sent in accordance with its strict timing requirements.

ABR manager 44 is a state machine which receives feedback from network 30 through control bus 56 from scheduler 34 and requests that scheduler 34 schedule a connection for the ABR mode of traffic in response to the feedback and to the parameters for the particular connection. Manager 44 implements an ABR flow control algorithm to process the feedback based upon user-programmable parameters and connection parameters. In general, ABR manager 44 indicates that a connection in the ABR mode of traffic should be scheduled and the types of cells which should be sent as part of the traffic via control bus 58. For example, ATM network 30 preferably handles three types of ABR cells: data cells, forward resource management (RM) cells, and backward RM cells. ABR manager 44 indicates the type of cell which scheduler 34 should schedule and the mode of traffic (e.g., an out-of-rate transmission or an in-rate transmission).

The in-rate transmission is scheduled by scheduler 34 as a "single bucket" VBR mode of traffic transmission, and the out-of-rate transmission is scheduled utilizing a dedicated priority level of queue 38. Generally, out-of-rate transmission is used for both out-of-rate forward RM cells that are requested at a low rate by ABR manager 44 and for out-of-rate backward RM cells that are requested by ABR manager 44 based on received traffic from network 30. A connection can send out-of-rate cells at the same time the connection is using VBR scheduling to send in-rate cells.

ABR manager 44 can also adjust the rate for a connection utilizing the ABR mode of traffic in response to feedback. Manager 44 can write new I and L parameter which are stored in memory 48 to adjust the rate according to a bucket algorithm . In this way, dynamic rate scheduling for ABR modes of traffic with fine granularity can be achieved.

Start FIFO memory 40 holds connection information related to data cells that have been received from a host or data source (not shown). Start FIFO memory 40 is processed by scheduler 34 to add connections to global priority queue 38 for eventual placement in schedule FIFO memory 42 and for eventual transmission on network 30. The connection information is the indication of the connection number of the data received by segmentation unit 46.

Figures 2, 3:
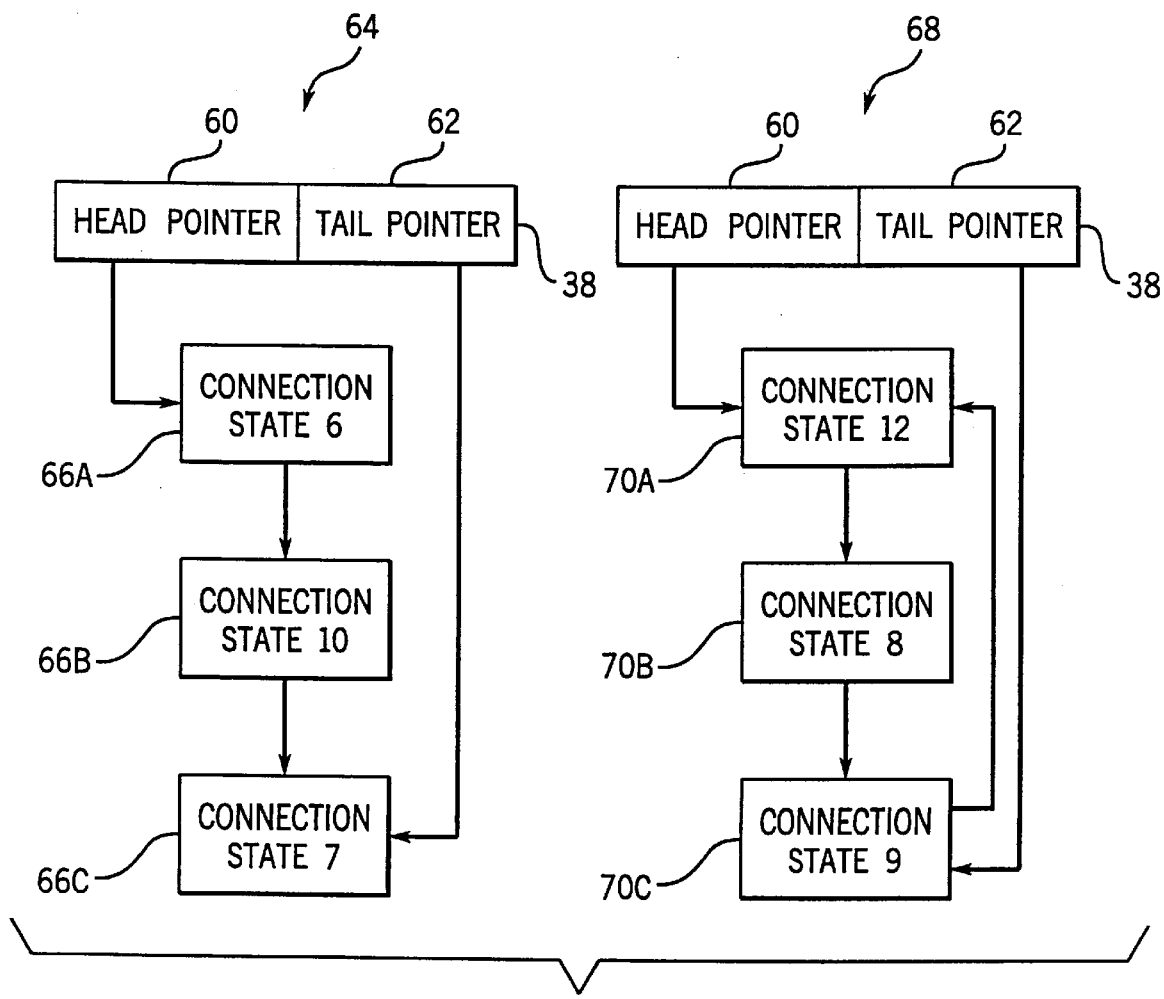
FIG. 2 is an exemplary schematic block diagram of a priority queue for the traffic class system illustrated in FIG. 1 in accordance with another exemplary embodiment of the present invention.
FIG. 3 is a schematic block diagram of a pair of linked lists defined by the priority queue illustrated in FIG. 2.

With reference to FIG. 2, global priority queue 38 is comprised of a head pointer stored in a column 60 and a tail pointer stored in a column 62. Queue 38 stores head pointers and tail pointers at priority levels 64A–I. Alternatively, queue 38 can store any number of priority locations. FIG. 2 shows exemplary priority levels associated with particular modes of traffic and an exemplary table-type data structure. For example, the out-of-rate UBR traffic mode is given the first priority (e.g. highest) at priority level 64A, and the UBR tunnel mode of traffic is given the last priority, level 64I, (e.g., lowest) in queue 38. The head pointer and tail pointer stored in columns 60 and 62, respectively, are simply an address or information which indicates a connection associated with the transmission. The head pointer and the tail pointer generally direct scheduler 34 to memory locations in control memory 48 which are described in more detail below with reference to FIG. 4.

To advantageously save memory space in queue 38 and to allow faster data transfer from scheduler 34 to queue 38, only the head pointer and the tail pointer are stored in global priority queue 38 for each of priority levels 64A–I. As an example, global priority queue 38 is shown including nine priority levels 64A–I that can be utilized. The priority levels for ABR, VBR, and UBR modes of traffic can be set by the user.

The head pointers and tail pointers can define a linked list of a number of connections for each of priority levels 64A–I. Exemplary linked lists are shown in FIG. 3. The linked lists are used to indicate a number of connections at the particular priority level of levels 64A–I in queue 38 without using a large amount of memory. Thus, queue 38 can indicate a large list of connections, even though only a head pointer and tail pointer are stored in queue 38.

Generally, priority queue 38 includes a register (not shown) which indicates when the head pointer in column 60 includes information. Priority level 64H is set inactive after this selection. In this way, scheduler 34 can simply check the register for each priority level of levels 64A–I rather than addressing priority queue 38 to determine if a head pointer is available in column 60. In this way, scheduler 34 saves time, as only one bit in the register needs to be checked to determine if a head pointer is present.

With reference to FIG. 3, a linked list 64 of connections for VBR that moves out traffic is defined by a head pointer in column 60 of queue 38 and a tail pointer in column 62 of queue 38. The head pointer provides an address or indication of a connection state 66A in control memory 48 (FIG. 1). Connection state 66A includes a pointer which points to a next connection state 66B stored in control memory 48. Connection state 66B includes a pointer which points to connection state 66C stored in control memory 48. The tail pointer stored in column 62 of queue 38 also points to connection state 66C. Therefore, for linked list 64, the head pointer in column 60 stores connection state 66A for the head of list 64 and the tail pointer in column 62 stores the connection state 66C for the end of list 64.

Similarly, a circular linked list 68 is shown in FIG. 3 which is defined by the head pointer in column 60 and the tail pointer in column 62. The head pointer in column 60 points to a first connection state 70A in circular linked list 68. Similar to linked list 64, state 70A includes a pointer which points to a connection state 70B, and connection state 70B includes a pointer which points to a connection state 70C. Connection states 70A–C are stored in control memory 48. Additionally, connection state 70C includes a pointer which points back to connection state 70A so that a circular buffer or linked list is defined. The tail pointer in column 62 also points to connection state 70C.

Linked list 64 is typically used for VBR modes of traffic, and linked list 68 is typically used for UBR modes of traffic. Circular linked list 68 facilitates roundrobin orientation of connections in queue 38 which are utilized by UBR connections. In UBR modes of traffic, the connection is typically not removed after transmission. Since the connection utilizing the VBR modes of traffic are typically removed from queue 38 after transmission, there is no advantage in maintaining a circular linked list such as link 68. The use of the head pointer in column 60 and tail pointer 62 allows easy access to both ends of lists 64 and 68. For example, if connections need to be added to linked list 64, the tail pointer provides directions to connection state 66C which is modified to point to the additional connection state (not shown). The tail pointer is then pointed to the additional connection state. For circular linked list 68, state 70C is modified to point to the additional state, and the additional state includes a pointer to state 70A. The tail pointer is amended to point to the additional state.

Figure 4:
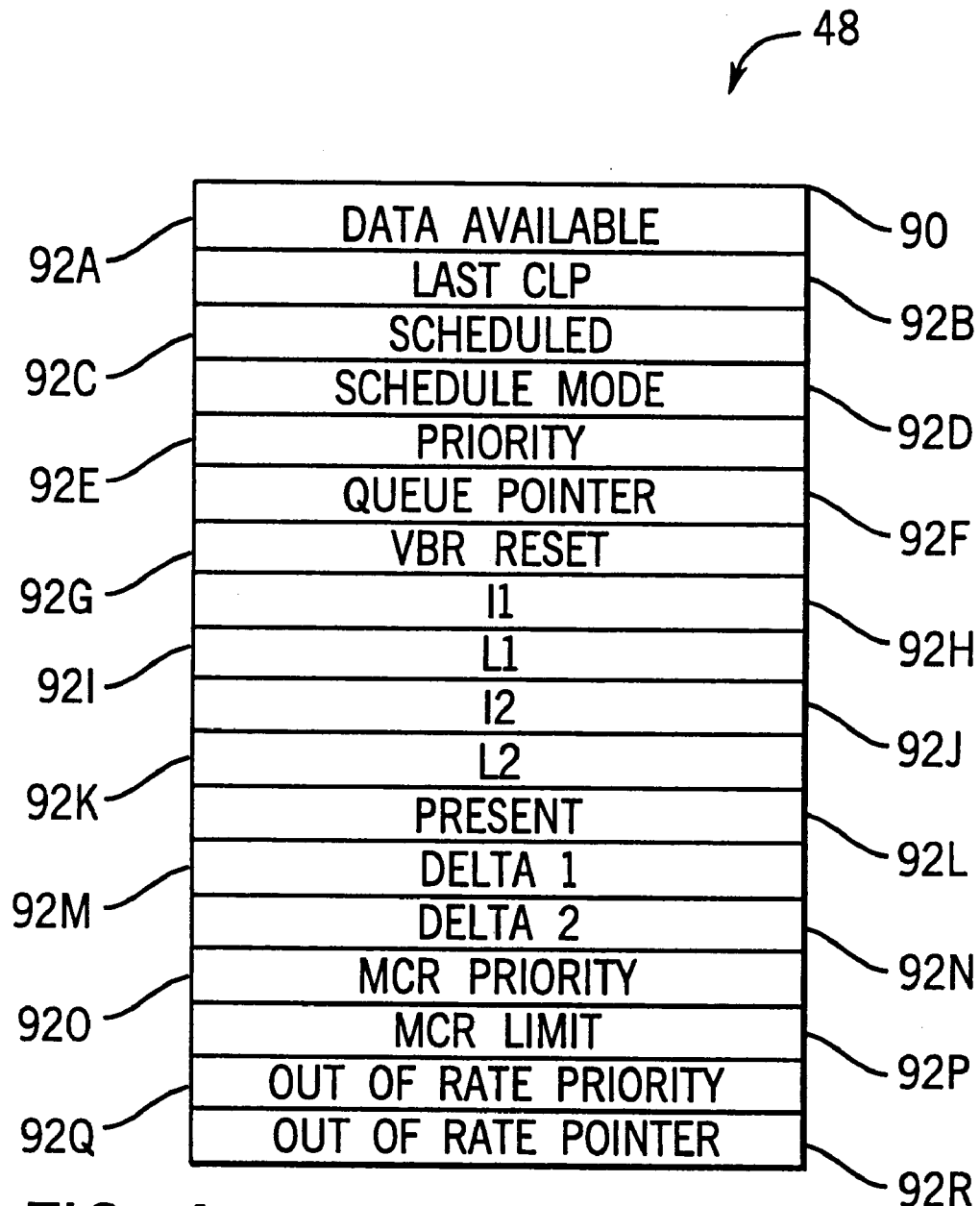
FIG. 4 is a schematic block diagram of a connection state data structure in the control memory for use with the traffic class manager system illustrated in FIG. 1 in accordance with another exemplary embodiment of the present invention.

With reference to FIG. 4, control memory 48 includes a data structure or connection state 90 which includes storage locations or fields 92A–R. Control memory 48 includes a connection state 90 for each connection associated with traffic class manager unit 25. Each state 90 represents a connection in network 30. State 90 in FIG. 4 represents the data structure of states 66A–C and 70A–C in FIG. 3.

A data available field 92A indicates whether data for the particular connection is available for transmission on network 30. A last CLP field 92B includes a cell loss priority (CLP) parameter which indicates the value of the cell loss priority for the most recently transmitted cell of the connection. A scheduled field 92C indicates that the connection is presently linked to a dynamic schedule table 88 (FIG. 5) within memory 48 or is part of a linked list, such as, lists 64 and 68 (FIG. 3) defined in global priority queue 38. A schedule mode field 92D indicates whether the connection utilizes an UBR, a CBR, a VBR1 (e.g., single bucket VBR), a VBR2 (e.g., dual bucket VBR), a VBRC (dual bucket CLP control), or an ABR mode of traffic.

A priority field 92E includes a priority parameter which indicates the scheduling priority of the connection. The priority parameter corresponds to priority levels 64A–I of queue 38 (FIG. 2) and provides an indication as to which priority level of levels 64A–I in priority queue 38 the connection should be stored.

A queue pointer field 92F stores a pointer for linking lists defined in dynamic schedule table 88 or in priority queue 38. The queue pointer for the connection is utilized in lists for VBR modes of traffic, such as, list 64 and in lists for the UBR modes of traffic, such as, list 68. A VBR reset field 92G stores a reset parameter for the VBR bucket algorithms (e.g., single bucket, dual bucket, or CLP bucket).

An I1 field 92H includes an I1 parameter for the first VBR bucket algorithm, and an L1 field 92I provides an L1 parameter for the first VBR bucket algorithm. An I2 field 92J provides an I2 parameter for the second VBR bucket algorithm, and an L2 field 92K provides an L2 parameter for the second VBR bucket algorithm.

A present field 92L provides a present parameter indicative of the time of the last VBR mode of traffic transmission for the connection. A delta 1 field 92M provides a delta 1 parameter indicative of the difference between the desired first bucket next transmission time and the last transmission time for VBR modes of traffic. A delta 2 field 92N provides a delta 2 parameter indicative of the difference between the desired second bucket next transmission time and the last transmission time for VBR modes of traffic.

A minimum cell rate (MCR) priority field 92O provides an MCR priority parameter for temporarily increasing the priority of the connection to provide MCR guarantees for ABR modes of traffic. An MCR limit field 92P provides an MCR limit parameter indicative of a maximum time interval between connection cell transmissions before the MCR priority parameter is set.

Out-of-rate priority field 92Q provides a scheduling priority parameter for out-of-rate cells for ABR modes of traffic. An out-of-rate pointer field 92R provides an out-of-rate pointer to a connection state 90. Similar to the queue pointer in field 92F, the out-of-rate pointer is used to build linked lists, such as, list 68 (FIG. 3).

Figure 5:
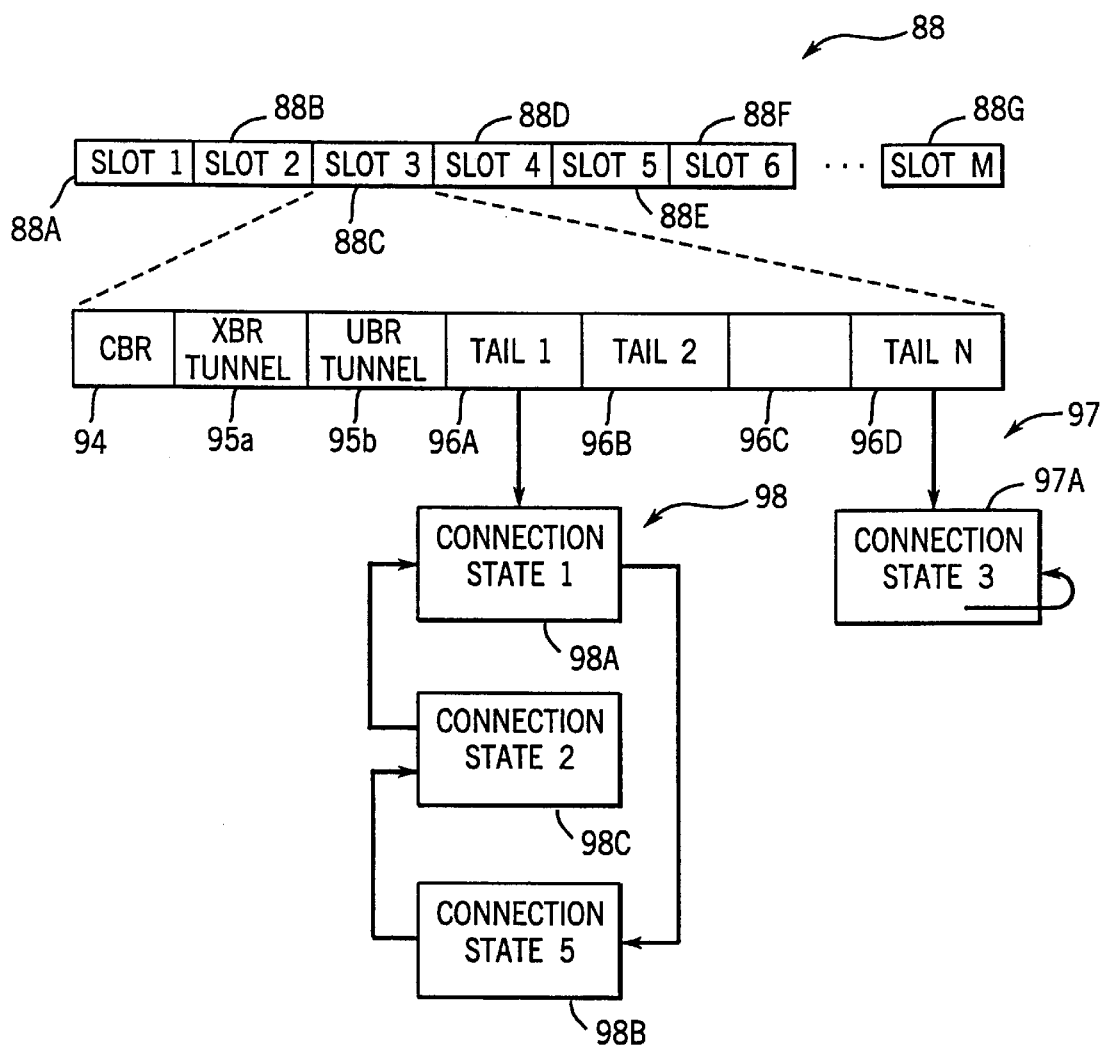
FIG. 5 is an exemplary schematic block diagram of a dynamic schedule table in the control memory for use with the traffic class manager system illustrated in FIG. 1 in accordance with yet another exemplary embodiment of the present invention.

With reference to FIG. 5, dynamic schedule table 88 is located in memory 48 (FIG. 1). Schedule table 88 is comprised of a number of slots 88A–G (e.g., from slot 1 to M where M is a user-programmable parameter). Slots 88A–G are each comprised of a CBR entry 94, a XBR_tunnel entry 95A, a UBR_tunnel entry 95B, and slot tail pointer entries 96A–D. Each of slots 88A–G can be configured to include a number of slot tail pointer entries 96A–D from 1 to N. Each of entries 96A–D is associated with a particular VBR priority level of levels 64A–I in queue 38 (FIG. 2). The VBR priority levels 1–N for entries 96A–D are mapped to global priority levels 64A–I via a fixed offset (although an arbitrary mapping is also possible).

CBR entry 94 stores connection information if a CBR mode of traffic connection should be transmitted. For example, when scheduler 34 processes slot 88C, scheduler 34 reads CBR entry 94, and if the connection information is present, scheduler 34 places the connection information in schedule FIFO memory 42.

Referring to tunnel entries 95A and 95B, there are at least three different variations of possible tunnel entries for indicating the activity of tunnel modes in accordance with the present invention. In one possible embodiment, there are two entries 95A and 95B corresponding to XBR_tunnel and UBR_tunnel modes, respectively. In this way, two tunnels can simultaneously operate in system 10.

In an alternative embodiment, there is only one tunnel entry 95A or 95B which indicates the activity of either XBR_tunnel or UBR_tunnel modes. Tunnel entry 95A or 95B does not indicate the activity of a specific tunnel mode, only that one of the two tunnel modes is active. Scheduler 34 determines which of the two modes is active elsewhere, such as when queue 38 is checked. In yet another alternative embodiment, slots 88A–G provide only one tunnel entry 95A to indicate XBR_tunnel mode.

In the embodiment using two entries 95A and 95B, XBR_tunnel entry 95A indicates that one of a group of connections, either in VBR mode or ABR mode, should be transmitted. In XBR_tunnel transmission mode, scheduler 34 reads entry 95A and activates XBR_tunnel priority level 64H in queue 38. Queue 38 includes a header of flag bit which is set when XBR_tunnel priority level is active. Columns 60 and 62 for the XBR tunnel priority level 64H define a linearly linked list (not shown) similar to linked list 64 (FIG. 3).

Scheduler 34 sends the connection at the head of the linked list defined by level 64H of queue 38 to schedule FIFO memory 42 the next time the queue 38 is accessed. Priority level 64H is accessed only when active even if the head pointer in column 60 has a connection entry. When active, the priority level 64H is accessed in the normal priority order. When the next slot of slots 88A–G that has an entry 95A is processed, scheduler 34 sets level 64H active, and the next connection in the linearly linked list of the XBR_tunnel priority level 64H is selected. Priority level 64H is set inactive after this selection. In this way, connection for the XBR_tunnel mode transmission is processed.

UBR_tunnel entry 95B indicates that one of a group of connections should be transmitted in round-robin order in the CBR mode of traffic. In UBR_tunnel transmission mode, scheduler 34 reads entry 95B and activates UBR_tunnel priority level 64I in queue 38. Queue 38 includes a header or flag bit which is set when UBR_tunnel priority level 64I is active. Columns 60 and 62 for the UBR_tunnel priority level 64I define a circular linked list (not shown) similar to linked list 68 (FIG. 3).

Scheduler 34 sends the connection at the head of the linked list defined by level 64I of queue 38 to schedule FIFO memory 42 the next time the queue 38 is accessed. Priority level 64I is accessed only when active even if the head pointer in column 60 has a connection entry. When active, the priority level 64I is accessed in the normal priority order. When the next slot of slots 88A–G that has an entry 95B is processed, scheduler 34 sets level 64I active, and the next connection in the circular linked list of the UBR_tunnel priority level 64I is selected. Priority level 64I is set inactive after this selection. In this way, connection for the UBR_tunnel mode transmission is processed.

Slot tail pointer entries 96A–D provide slot tail pointers which indicate a connection state at the tail of a linked list (not shown). For example, when slot 88C is processed, scheduler 34 reads the slot tail pointer in entry 96A and addresses a connection state 96A (having the structure of connection state 90 in FIG. 4). State 96A includes a queue pointer field 92F (FIG. 4) which points to a state 98B (e.g., the head of linked list 98). Similarly, state 98B points to a state 98C which points to state 98A. The head of linked list 98 is reached by following the tail entry 96A to the tail of the list (state 98A) and then following the queue pointer in field 92F of state 98A to the head of list 98 (e.g., state 98B). Entries 96A–D are used for VBR modes of traffic.

When scheduler 34 reads entry 96D, scheduler 34 is directed to a linked list 97. List 97 is comprised of one connection state 97A. The queue pointer in field 92F of state 97A points to itself (connection state 97A). Thus, the tail pointer in entry 96D and the queue pointer in field 92F of state 97A are the same.

Dynamic schedule table 88 can be programmed to be various sizes. The capability allows scheduler 34 to customize table 88 for various CBR modes of traffic. Since the size of table 88 is variable, scheduler 34 is more precisely able to schedule specific rates for CBR modes of traffic.

Figure 6:
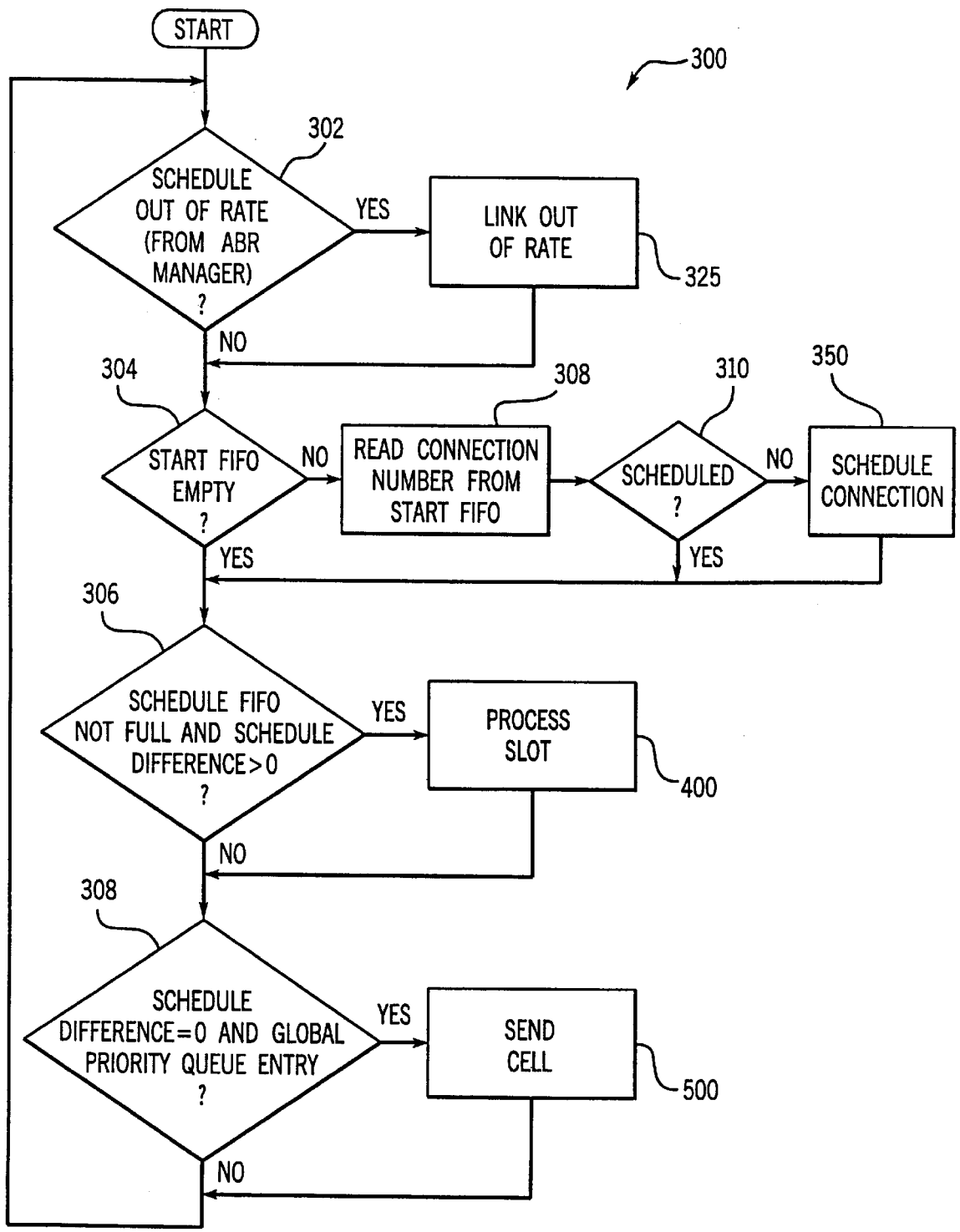
FIG. 6 is a top level flow chart showing the general operation of the traffic class manager system illustrated in FIG. 1 in accordance with still another embodiment of the present invention.

With reference to FIGS. 6–12, the notation A6B means the field B (fields 92A–R) in connection state 90 indicated by the pointer A. With reference to FIG. 6, scheduler 34 operates according to a top level flow chart 300. Scheduler 34 determines if an out-of-rate ABR connection must be scheduled at a step 302. At step 302, scheduler 34 determines if a signal from ABR manager 44 has been provided on control bus 58 indicating that an out-of-rate ABR mode of traffic connection must be scheduled.

Connections may need to be scheduled for out-of-rate transmissions of RM cells. Out-of-rate scheduling is used for both out-of-rate forward RM cells that are requested at a low rate by manager 44 and for out-of-rate backward RM cells that are requested by manager 44 based on traffic received from ATM network 30. If scheduler 34 has received a signal from manager 44 that an out-of-rate ABR connection should be scheduled, scheduler 34 performs a flow chart 325 described with reference to FIG. 7.

If an out-of-rate transmission does not need to be scheduled, scheduler 34 advances from step 302 to a step 304. After flow chart 325 is completed, scheduler 34 advances to step 304.

At step 304, scheduler 34 determines if start FIFO memory 40 is empty. If start FIFO memory 40 is empty, scheduler 34 advances to a step 306, as scheduler 34 does not have to process any connection information stored in FIFO memory 40. If start FIFO memory 40 is not empty (e.g., start FIFO memory 40 has received new connection information), scheduler 34 reads the connection information stored in start FIFO memory 40 at a step 308.

At a step 310, scheduler 34 determines if the connection associated with the connection information read from start FIFO memory 40 has been scheduled by reading scheduled field 92C of connection state 90 (FIG. 4) associated with the connection. If the connection has been scheduled, scheduler 34 advances to step 306. If the connection has not been scheduled, scheduler 34 performs a schedule connection flow chart 350 described with reference to FIG. 8. After schedule connection flow chart 350 is completed, scheduler 34 advances to step 306.

At step 306, scheduler 34 determines if schedule FIFO memory 42 is not full and if a schedule difference parameter is greater than zero. The schedule difference parameter is derived from timing signals provided by timer 36. The schedule difference parameter is indicative of whether scheduler 34 has reached the appropriate slot at the appropriate real time. For example, the schedule difference parameter is representative of the actual slot position minus the desired slot position at a particular time. The schedule difference parameter is incremented whenever the amount of time for the processing of one of slots 88A–G is elapsed and is decremented whenever one of slots 88A–G is processed. Therefore, the schedule difference parameter keeps track of the time for processing slots 88A–G. If the schedule difference parameter is greater than zero (scheduler 34 is late), scheduler 34 should process a slot to bring the schedule difference parameter to zero (scheduler 34 is not late).

If schedule FIFO memory 42 is not full and the schedule difference parameter is greater than zero, scheduler 34 advances to a process slot flow chart 400 discussed with reference to FIG. 9. After process slot flow chart 400 is completed, scheduler 34 advances to a step 308. At step 306, if either schedule FIFO memory 42 is full or if schedule difference is equal to zero, scheduler 34 advances to step 308. Scheduler 34 should not process a slot if schedule FIFO memory 42 is full because there is no place to store any additional connections in FIFO memory 42. Additionally, if the schedule difference parameter is equal to zero, the timing is not appropriate (e.g. it is too early) to process the slot. More particularly, the appropriate sending parameters for the connections could be violated if slots 88A–G are processed too early (e.g., when the schedule difference parameter is zero).

At step 308, scheduler 34 determines if the schedule difference parameter is equal to zero and if global priority queue 38 is empty. When schedule difference parameter equals zero, the timing is appropriate for scheduler 34 to schedule a connection on schedule FIFO memory 42. If the schedule difference parameter is greater than zero, scheduler 34 should not transmit cells until the scheduler 34 catches up (e.g., the schedule difference parameter equals zero). Priority isolation for UBR modes of connections is ensured by only processing queue 38 when the schedule difference parameter is equal to zero. Additionally, if there are no global priority queue entries in levels 64A–I of global priority queue 38, there are no connections available. Therefore, if the schedule difference parameter is greater than zero or there are no global priority queue entries, then scheduler 34 returns to step 302.

If the schedule difference parameter is zero and there is a global priority queue entry in global priority queue 38, scheduler 34 performs a send cell flow chart 500. After flow chart 500 is completed as discussed with reference to FIGS. 11A–C, scheduler 34 returns to step 302.

Figure 7:
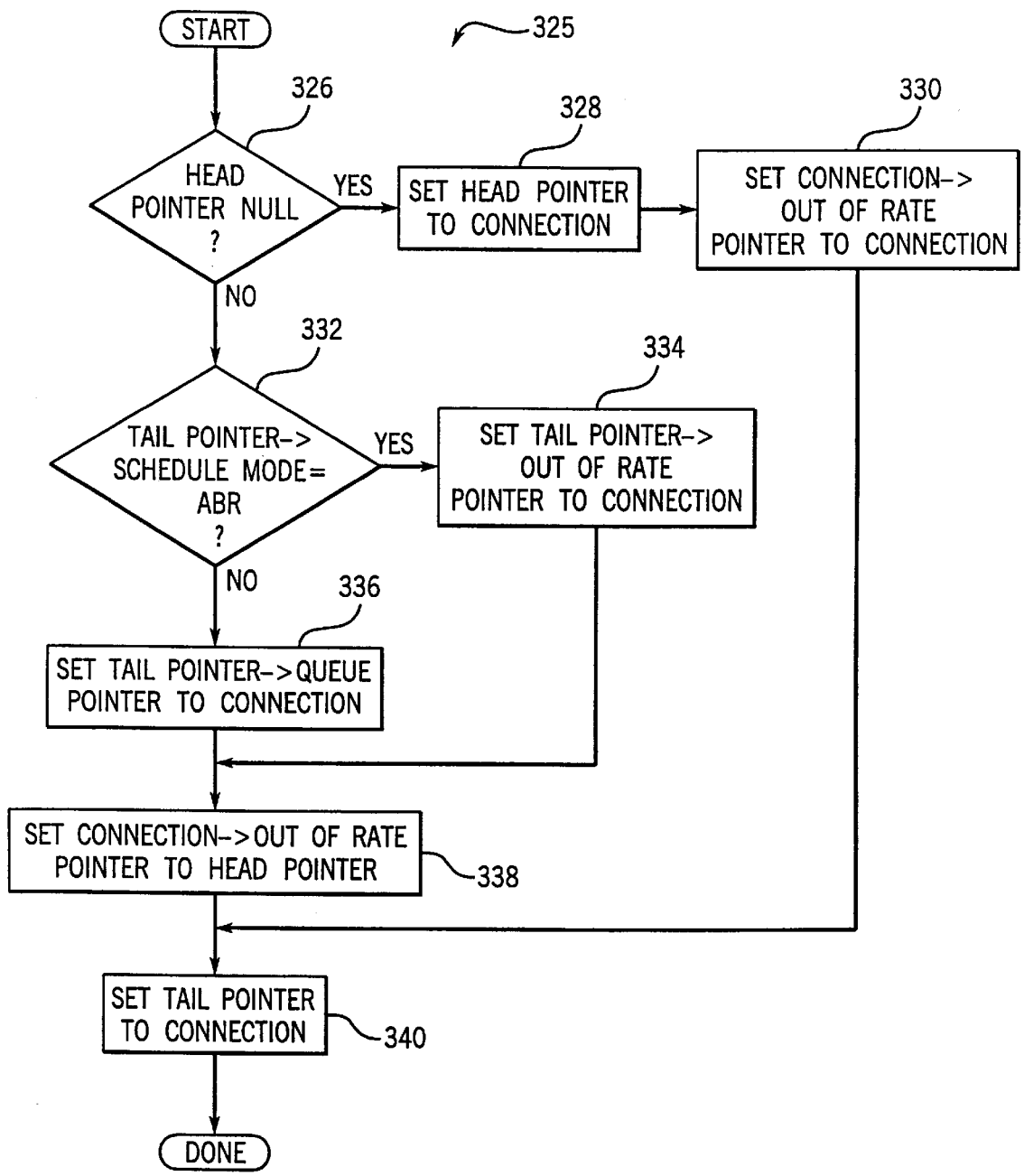
FIG. 7 is a flow chart showing the link-out of-rate operation illustrated in FIG. 6.

With reference to FIG. 7, link out-of-rate flow chart 325 is utilized by scheduler 34 to link a connection to the out-of-rate priority level of global priority queue 38 (FIG. 2, e.g., priority level 64A). At a step 326, scheduler 34 determines if the head pointer 60 at the out-of-rate priority level 64A of global priority queue 38 is null. If the head pointer is null, scheduler 34 advances to a step 328 and sets the head pointer in column 60 of queue 38 to the connection provided by ABR manager 44. After step 328, scheduler 34 advances to a step 330 and sets the out-of-rate pointer in field 92R in connection state 90 for the connection to the connection provided by ABR manager 44. After step 330, scheduler 34 advances to a step 340.

Steps 326, 328, and 330 build a circular linked list consisting of the connection provided by manager 44. If the head pointer is null, there are no out-of-rate connections stored in global priority queue 38, since out-of-rate connections are stored in circular linked lists, such as, list 68 (FIG. 3). The UBR modes of traffic, such as, the out-of-rate mode have connections circularly linked to facilitate round-robin orientation of the connection in queue 38. If no other connections are in the out-of-rate queue, the new connection should be linked onto itself.

If the head pointer in column 60 of queue 38 for the out-of-rate priority level 64A is not null, then scheduler 34 advances to a step 332. If the head pointer is not null, a linked list, such as, list 68 (FIG. 3) already exists for the out-of-rate connections. The connection provided by ABR manager 44 must then be circularly linked to the existing linked list.

At step 332, scheduler 34 reads the schedule mode field 92D of connection state 90 for the connection indicated by the tail pointer at priority level 64A in column 62 of global priority queue 38. Scheduler 34 determines if field 92D indicates that the connection is in the ABR mode. If scheduler 34 determines that the ABR mode has been set in schedule mode field 92D, a circularly linked list must be built utilizing the out-of-rate pointer in field 92R for the connection indicated by the tail pointer in column 62 of queue 38. The out-of-rate pointer in field 92Q is set to the connection provided by manager 44 in a step 334. After step 334, scheduler 34 advances to a step 338.

If in step 332 the schedule mode field 92D is not set to ABR mode, then the connection is an UBR mode of traffic and not an ABR mode of traffic, and scheduler 34 advances to a step 336. Therefore, the queue pointer in field 92F is utilized as opposed to the out-of-rate pointer in field 92R to build the linked list at step 336. In step 336, the queue pointer in field 92F for state 90 indicated by the tail pointer in queue 38 is set to the connection provided by manager 44.

After step 336, a scheduler 34 advances to step 338 where the out-of-rate pointer in field 92R of state 90 for the connection provided by ABR manager 44 is set to the head pointer in column 60 of queue 38. At a step 340, the tail pointer in column 62 is set to the connection provided by manager 44, and flow chart 325 is completed. In this way, a circular queue is built for both ABR linked lists which utilize the out-of-rate pointer in field 92R and for UBR linked lists which utilize the queue pointer in field 92F.

Figure 8:
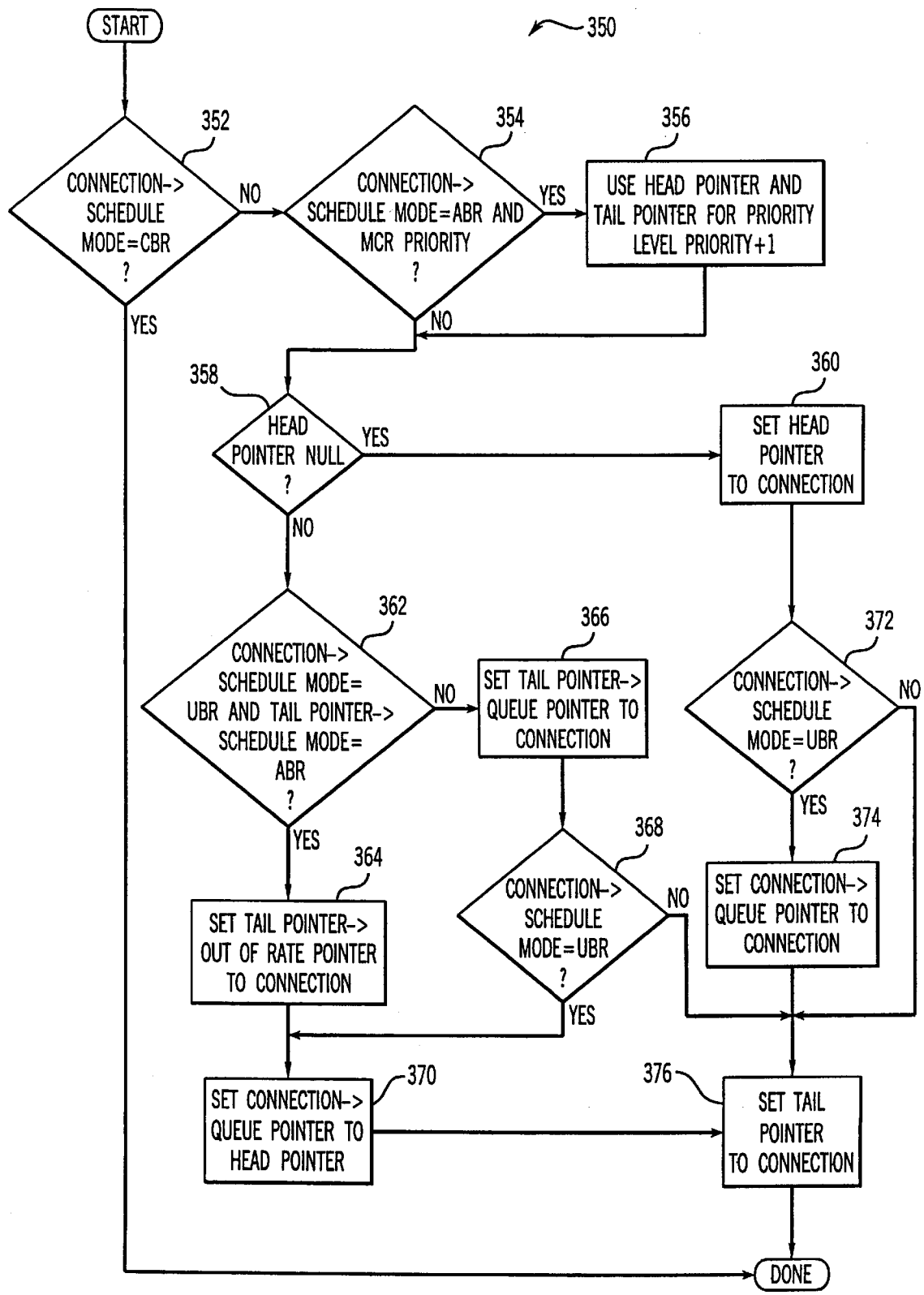
FIG. 8 is a flow chart showing the schedule connection operation illustrated in FIG. 6.

With reference to FIG. 8, scheduler 34 performs schedule connection flow chart 350 to add connections from start FIFO memory 40 to global priority queue 38. Typically, scheduler 34 schedules connections by placing the connections on the global priority queue 38 by inserting the connection number or connection information in the head pointer in column 60 and in the tail pointer in column 62.

At a step 352, scheduler 34 determines if connection state 90 of the connection provided by start FIFO memory 40 has a schedule mode field 92D set to a CBR mode of traffic. If so, the connection does not have to be scheduled because it is already scheduled on dynamic schedule table 88 in an entry 94 and will automatically be transferred to schedule FIFO memory 42 when the appropriate slot of slots 88A–G is processed. The nature of CBR mode of traffic is such that the connection must be sent at particular times defined by slots 88A–G to meet strict protocol requirements.

If schedule mode field 92D does not indicate that the connection is a CBR connection, scheduler 34 advances to a step 354 and determines whether connection state 90 of the connection indicated by start FIFO memory 40 has field 92D set to an ABR mode and a field 920 which indicates MCR priority. If connection state 90 indicates ABR mode and the MCR priority, then scheduler 34 advances to a step 356.

At step 356, the priority level, such as, levels 64A–I, for the connection is increased by utilizing the head pointer for a priority level one above the priority level indicated in connection 90 by the priority level parameter in field 92E. The higher priority level is utilized for the remaining steps in flow chart 350. After a step 356, scheduler 34 advances to a step 358. In step 354, if state 90 indicates no ABR mode or no MCR priority for the connection, scheduler 34 advances to step 358.

At step 358, scheduler 34 determines if the head pointer in column 60 of queue 38 for the particular priority level of levels 64A–I is null. If the head pointer for the particular priority level is null, then there are no connections currently scheduled for the priority level, and the head pointer is set to the connection at a step 360. If the head pointer is not null, the connection must be attached to an existing linked list for the priority level stored in priority queue 38 (beginning at a step 362).

In step 362, if scheduler 34 determines that schedule mode field 92D of connection state 90 of the connection from start FIFO memory 40 indicates a UBR mode, and schedule field 92D of connection state 90 pointed to by the tail pointer in queue 38 indicates an ABR mode, then scheduler 34 advances to a step 364. At step 364, scheduler 34 sets the out-of-rate pointer in field 92R for connection state 90 pointed to by the tail pointer in queue 38 to the connection provided by start FIFO memory 40.

If field 92D of the connection indicates no UBR mode or field 92D pointed to by the tail pointer indicates no ABR mode at step 362, scheduler 34 advances to a step 366. At step 366, scheduler 34 sets the queue pointer in field 92F of connection state 90 pointed to by the tail pointer to the connection provided by start FIFO memory 40.

After step 366, scheduler 34 advances to a step 368 and determines if the schedule mode field 92D of the connection provided by start FIFO memory 40 indicates an UBR mode. If so, a circular buffer must be built, and scheduler 34 advances to a step 370 where the queue pointer in field 92F of connection state 90 for the connection provided by FIFO memory 40 is set to the head pointer of global priority queue 38. If not, scheduler 34 advances to a step 376. After step 364, scheduler 34 advances to step 370.

After step 360, scheduler 34 advances to a step 372 and determines if schedule mode field 92D of connection state 90 for the connection provided by FIFO memory 40 indicates an UBR mode. If so, scheduler 34 advances to a step 374 and sets the queue pointer in field 92F of connection state 90 to the connection provided by FIFO memory 42 (e.g., to the head pointer). If not, scheduler 34 advances to a step 376. After a step 374, scheduler 34 advances to step 376. At step 376, scheduler 34 sets the tail pointer in queue 38 to the connection provided by start FIFO memory 40. After step 370, scheduler 34 advances to step 376. In step 368, if field 92D does not indicate an UBR mode, scheduler 34 advances to step 376. After step 376, flow chart 350 is completed.

Steps 354–376 allow scheduler 34 to determine if the connection in start FIFO memory 40 utilizes an UBR, ABR, or VBR mode of traffic. If the connection utilizes an ABR mode or a UBR mode, the connection is circularly linked in priority queue 38. If the connection utilizes a VBR mode, a non-circular linked list is built.

Figure 9:
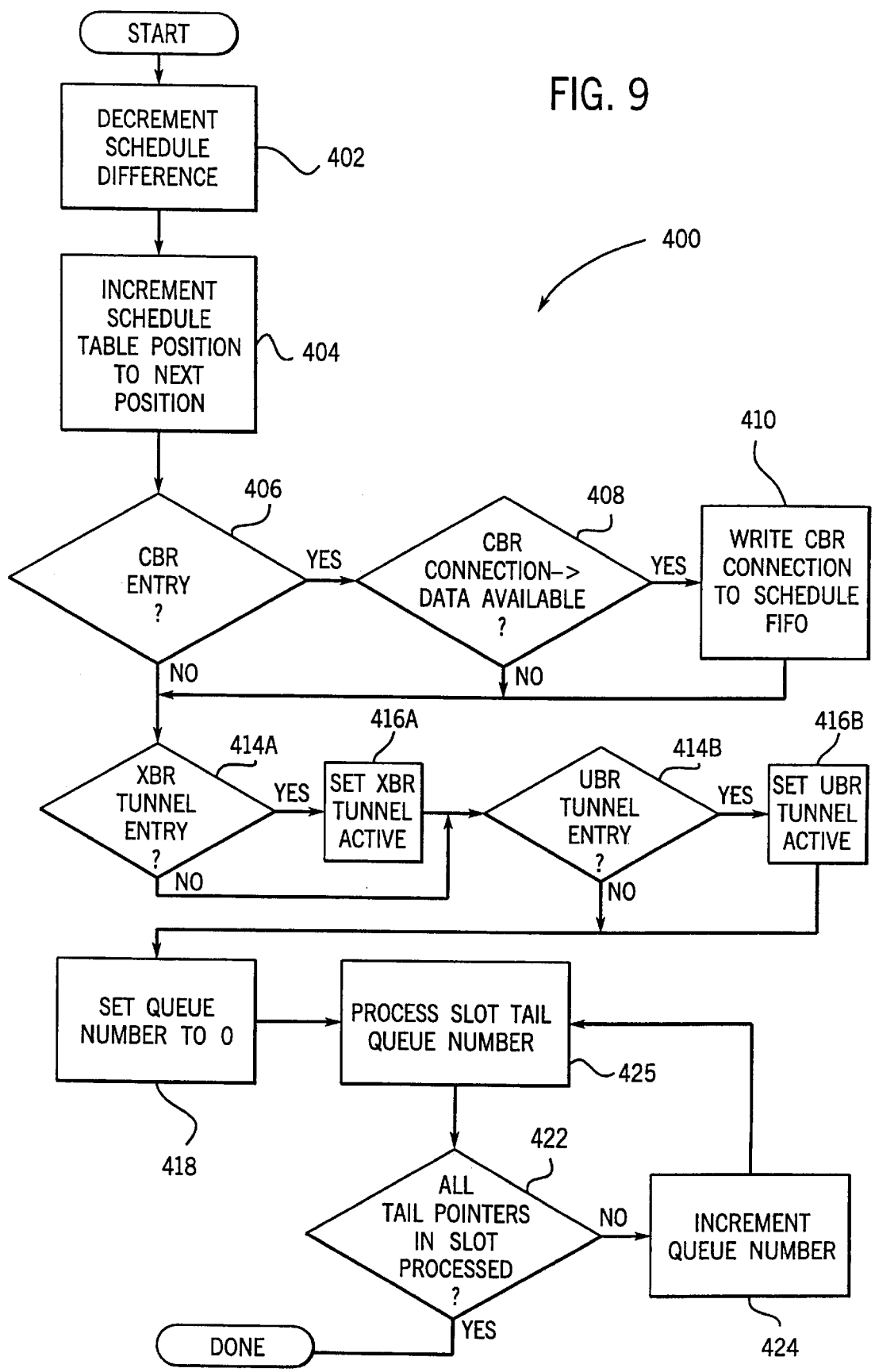
FIG. 9 is a flow chart showing the process slot operation illustrated in FIG. 6.

With reference to FIG. 9, process slot flow chart 400 is utilized so scheduler 34 can process a slot of slots 88A–G in dynamic schedule table 88. In this example, slot 88C is processed for illustration only. At a step 402, the schedule difference parameter is decremented to accurately represent the temporal relationship between the real time and the position of scheduler 34 with respect to slots 88A–G. At a step 404, scheduler 34 increments the schedule table position to the next position of slots 88A–G to accurately reflect the position on table 88. In this example, the scheduled table position is incremented to point to slot 88C.

At a step 406, scheduler 34 determines if CBR entry 94 of slot 88C includes connection information. If so, scheduler 34 advances to a step 408. At step 408, scheduler 34 determines if connection state 90 indicated by the connection in entry 94 of slot 88C has data available field 92A set to indicate that the data associated with the connection is available.

If the data is available for the connection, scheduler 34 writes the connection in entry 94 to schedule FIFO memory 42 in a step 410. Scheduler 34 writes the CBR connection directly to scheduler 42 as opposed to global priority queue 38 because of the conformance requirements for the CBR mode of traffic. In this way, scheduler 34 guarantees that CBR connection will be transmitted appropriately.

In step 408, if data available field 92A indicates that the data for the connection is not available, scheduler 34 advances to a step 414. In step 406, if entry 94 does not include connection information, scheduler 34 advances to step 414A.

At step 414A, scheduler 34 determines if XBR_tunnel entry 95A of slot 88C indicates that a XBR tunnel transmission is scheduled. A XBR tunnel transmission typically consists of several connections distributed either in VBR or ABR modes. The linearly linked list of the XBR (ABR or VBR) connections associated with tunnel entry 95A is provided in global priority queue 38.

At a step 416A, scheduler 34 sets the XBR_tunnel active by providing an appropriate header for priority level 64H associated with XBR_tunnel transmission in priority queue 38. After step 416A, scheduler 34 advances to a step 414B. In step 414A, if XBR_tunnel entry 95A does not indicate that there is a XBR tunnel connection for slot 88C, scheduler 34 advances to step 414B.

At step 414B, scheduler 34 determines if UBR_tunnel entry 95B of slot 88C indicates that a UBR tunnel transmission is scheduled. A UBR_tunnel transmission typically consists of several connections distributed in a round-robin order. The circularly linked list of the connections associated with UBR_tunnel entry 95B is provided in global priority queue 38.

At a step 416B, scheduler 34 sets the UBR_tunnel active by providing an appropriate header for priority level 64I associated with UBR_tunnel transmission in priority queue 38. After step 416B, scheduler 34 advances to a step 418. In step 414B, if UBR_tunnel entry 95B does not indicate that there is a UBR tunnel connection for slot 88C, scheduler 34 advances to a step 418.

At step 418, scheduler 34 sets the queue number for slot tail pointer entries 96A–D to one indicating entry 96A. After step 418, scheduler 34 advances to a flow chart 425 described with reference to FIG. 10 and processes the slot tail pointer provided in entry 96A. At a step 422, scheduler 34 determines if all of tail entries 96A–D have been processed. If not, scheduler 34 advances to a step 424 where the queue number is incremented. After step 424, scheduler 34 returns to flow chart 425. To complete processing slot 88C, scheduler 34 would perform flow chart 425 for each of entries 96A–D by performing the loop comprised of chart 425, step 422, and step 424. If in step 422 all of the entries 96A–D have been processed, scheduler 34 has completed flow chart 400.

Figure 10:
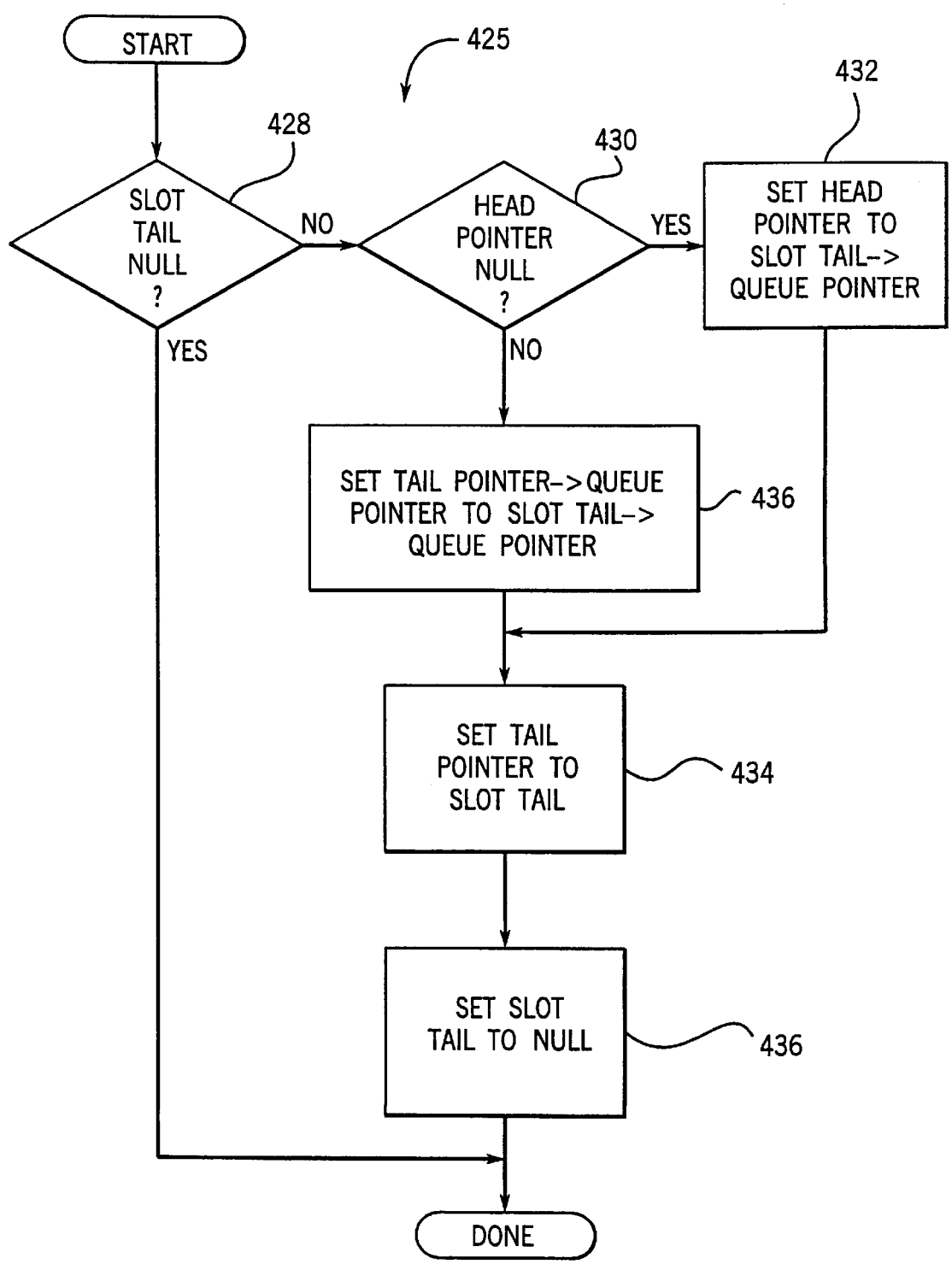
FIG. 10 is a flow chart showing the process slot tail queue number operation illustrated in FIG. 9.

With reference to FIG. 10, scheduler 34 performs the process slot tail queue flow chart 425 to process the slot tail pointer indicated by entries 94A–D in slot 88C (for example only). The queue number associated with entries 96A–D have a relationship to the priority levels 64A–I in priority queue 38. Preferably, there is a fixed offset between the VBR priority levels of entries 96A–D and priority levels 64A–I of queue 38.

In this example, entry 96A is processed. At step 428, scheduler 34 determines if the tail pointer in entry 96A is null. If so, there are no VBR connections in entry 96A and flow chart 425 is completed. If a slot tail pointer is provided in entry 96A, scheduler 34 advances to a step 430.

At step 430, scheduler 34 determines if the head pointer in column 60 of queue 38 for the priority level indicated by slot tail pointer entry 96A is null. If so, scheduler 34 advances to a step 432. At step 432, scheduler 34 sets the head pointer in priority queue 38 to the queue pointer in field 92F of connection state 90 pointed to by the slot tail pointer in entry 96A. After a step 432, scheduler 34 advances to a step 434.

If the head pointer is not null in step 430, scheduler 34 advances to a step 436 and adds the connection to an already existing linked list defined in queue 38. At step 436, scheduler 34 sets the queue pointer in field 92F of connection state 90 indicated by the tail pointer in column 62 of global priority queue 38 to the queue pointer stored in field 92F of connection state 90 indicated by the slot tail pointer in entry 96A. For example, connection slate 98B at the head of list 98 is added to the linked list defined in queue 38. In this way, list 98 (FIG. 5) is added to the list defined in queue 38. After a step 436, scheduler 34 advances to step 434.

At step 434, the tail pointer in column 62 of priority queue 38 is set to the slot tail pointer in entry 92A. In this example, the slot tail pointer points to state 98A, and all of list 98 is added to the list in queue 38, with only slot tail pointer and a queue pointer being updated. After step 434, scheduler 34 advances to a step 436 and sets the slot tail pointer in entry 96A to null, thereby clearing entry 96A. After step 436, flow chart 425 is completed.

Figure 11A:
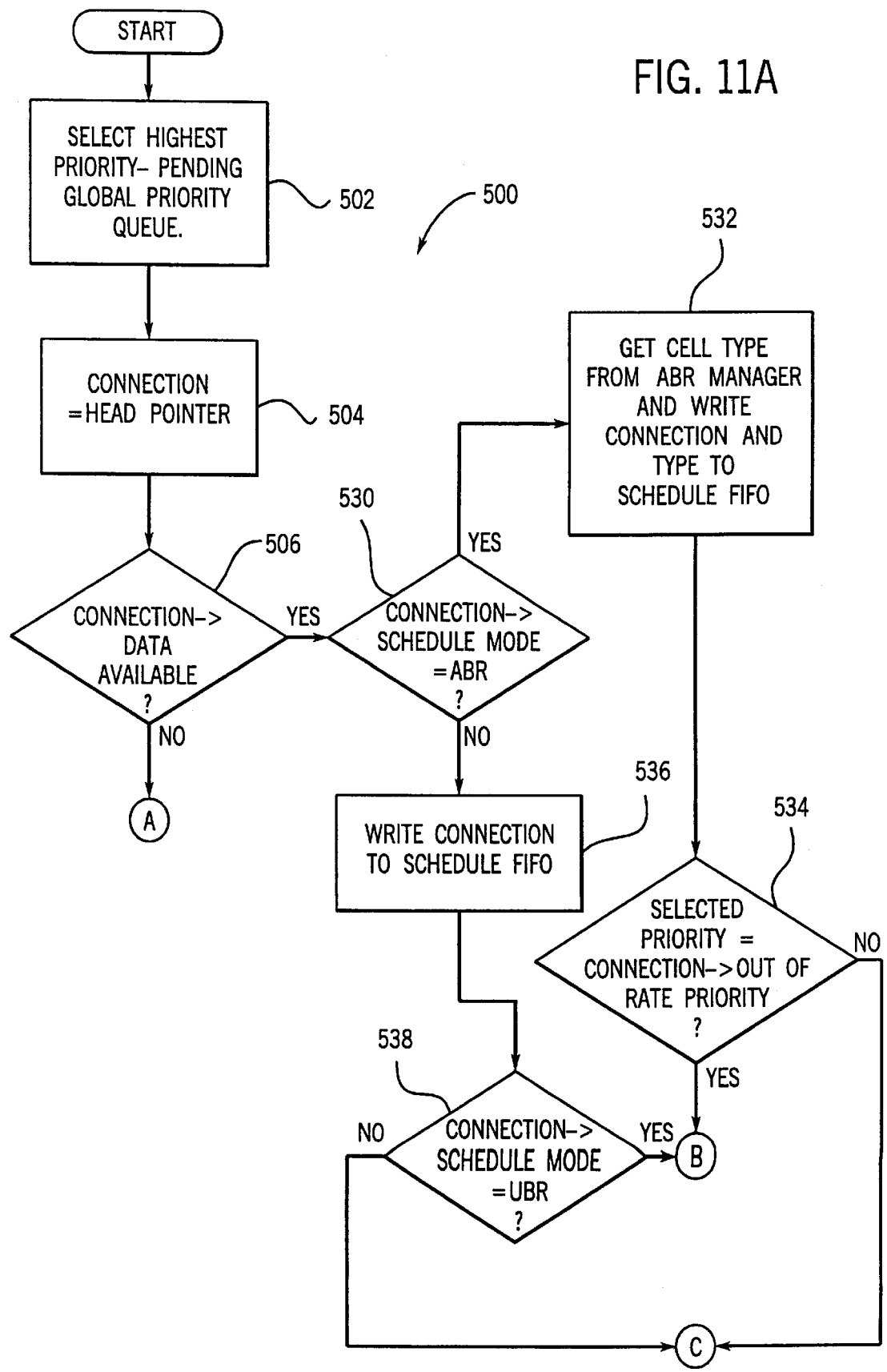
FIGS. 11A–C include a flow chart showing the send cell operation illustrated in FIG. 6.
Figure 11B:
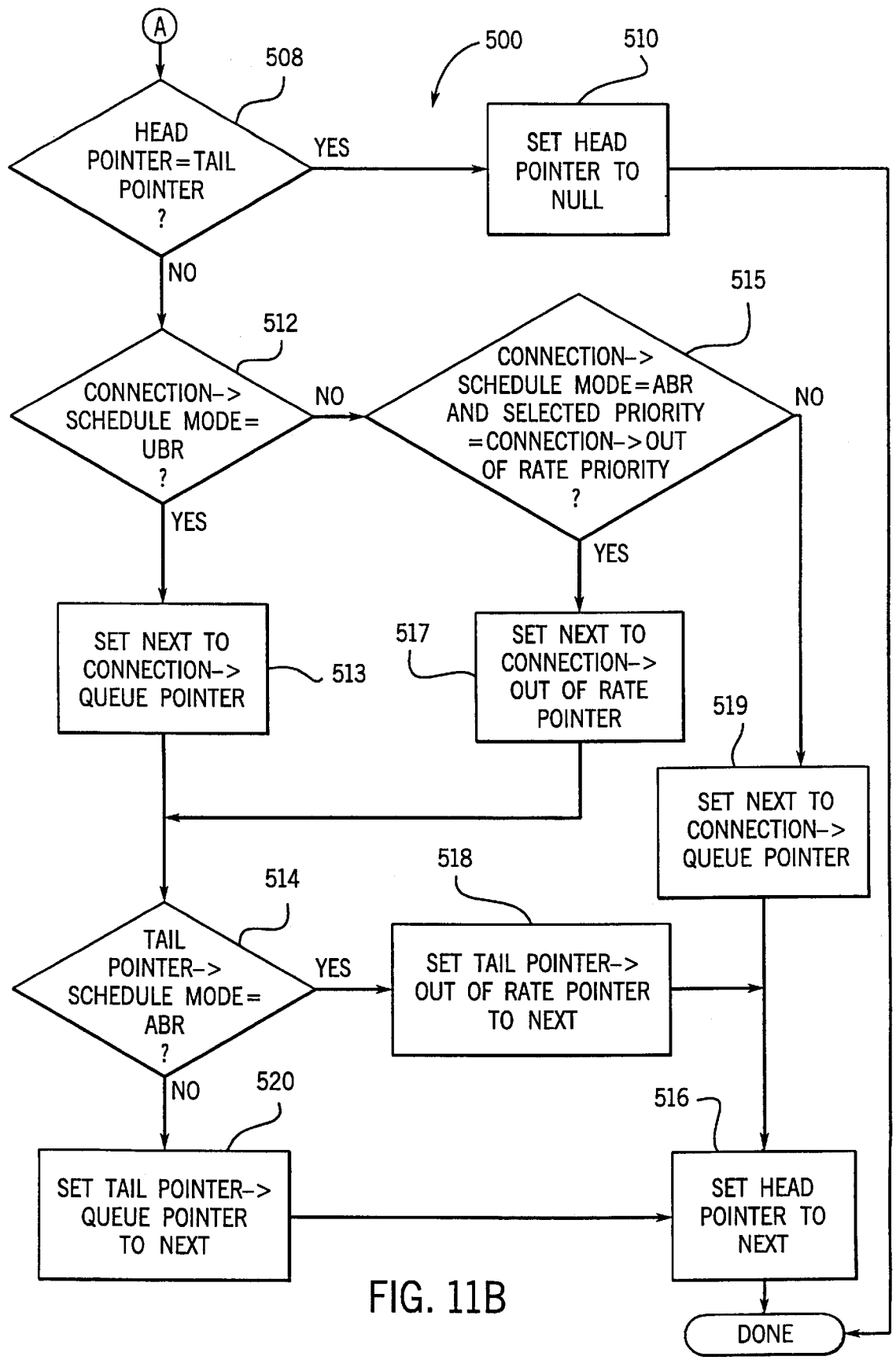
Figure 11C:
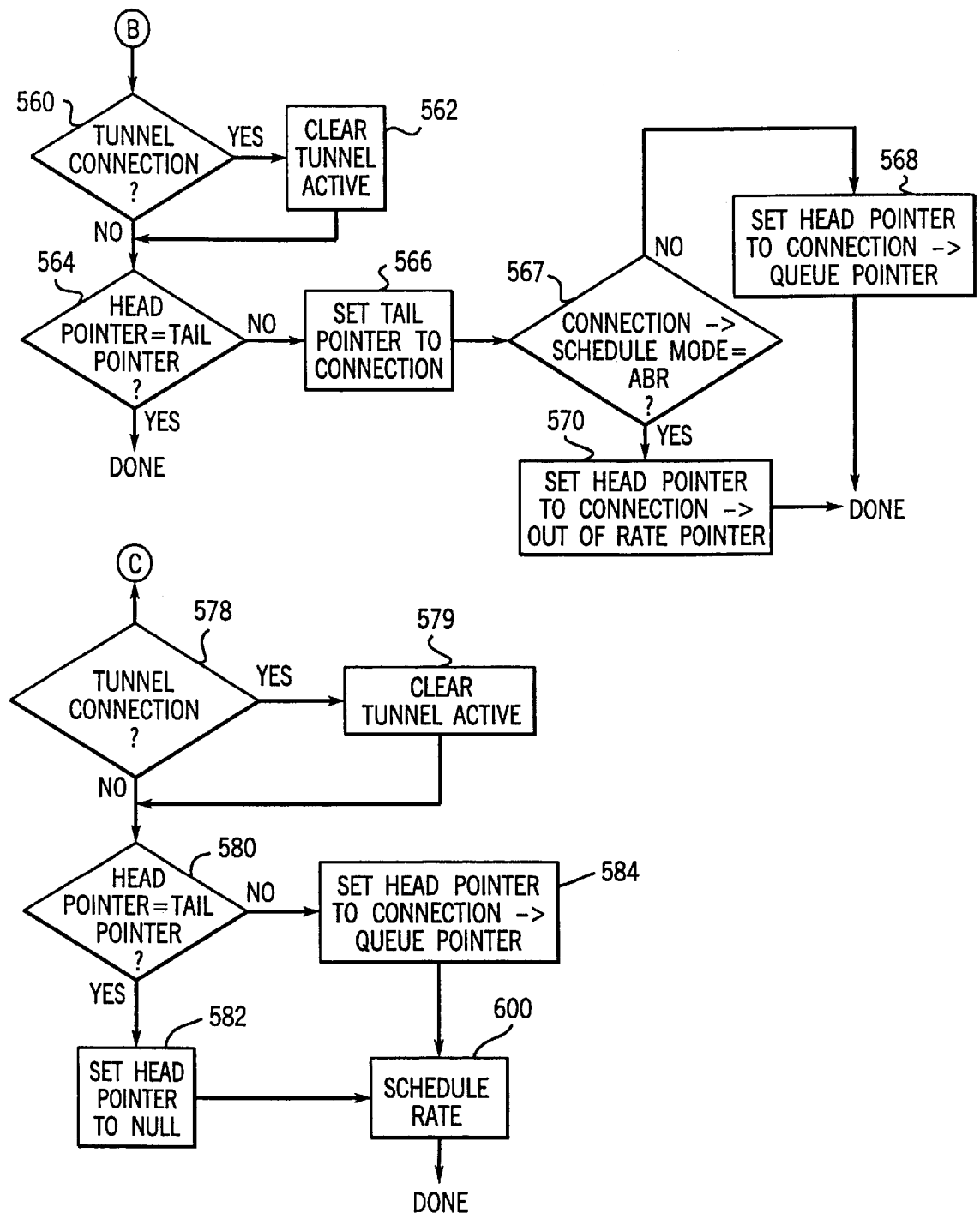

With reference to FIGS. 11A–C, scheduler 34 performs send cell flow chart 500 to send the highest priority pending connection from global priority queue 38.

At a step 502, scheduler 34 selects the connection stored in the highest pending global priority level of levels 64A–I of global priority queue 38. After step 502, scheduler 34 sets the connection number equal to the connection associated with the head pointer stored in column 60 of queue 38 for the highest pending global priority level of levels 64A–I at a step 504.

After step 504, scheduler 34 determines if data available field 92A for connection state 90 for the connection indicates that data is available at a step 506. If not, scheduler 34 advances to a step 508 (FIG. 11B), and begins to remove the connection from global priority queue 38. The connection must be removed from the global priority queue to ensure that it is not continually selected.

At step 508, scheduler 34 determines if the head pointer is equal to the tail pointer in priority queue 38. If so, scheduler 34 advances to a step 510 and sets the head pointer in priority queue 38 to null. When the head pointer and the tail pointer are equal, scheduler 34 determines that there is only one connection associated with the linked list defined by queue 38. Therefore by setting the head pointer in column 60 to null, the linked list is effectively eliminated from queue 38. The tail pointer in column 62 does not have to be set to null because the head pointer in column 60 is always checked first. After step 510, flow chart 500 is completed.

At step 508, if the head pointer is not equal to the tail pointer, scheduler 34 advances to a step 512. At step 512, scheduler 34 determines if connection state 90 for the connection indicated by the head pointer of queue 38 has a schedule mode field 92D which indicates an UBR mode. If so, scheduler 34 must eliminate the connection from the circular linked list associated with the priority level in queue 38 and advances to a step 513. If not, scheduler 34 advances to a step 515.

At step 513, scheduler 34 sets a next parameter to the queue pointer in field 92F. The next parameter indicates the next connection to which the linked list associated with queue 38 should be set.

At step 515, scheduler 34 determines if field 92D indicates an ABR mode and if the selected priority is equal to the out-of-rate priority parameter in field 92Q. If so, scheduler 34 sets a next parameter to the out-of-rate pointer in field 92R at a step 517 (e.g., chooses the out-of-rate connection). If not, scheduler 34 sets a next parameter to the queue pointer in field 92F at a step 519. After step 517, scheduler 34 advances to a step 514. After step 519, scheduler 34 advances to a step 516.

At step 514, scheduler 34 determines if field 92D of connection state 90 pointed by the tail pointer in queue 38 indicates an ABR mode. If so, scheduler 34 advances to a step 518 and sets the out-of-rate pointer field 92R in state 90 for the connection indicated by the tail pointer of queue 38 to the next parameter. After step 518, scheduler 34 advances to step 516.

At step 514, if field 92D does not indicates an ABR mode, scheduler 34 advances to a step 520. At step 520, scheduler 34 sets the queue pointer in field 92F in connection state 90 pointed to by the tail pointer of queue 38 to the next parameter. After step 520, scheduler 34 advances to step 516.

At step 516, scheduler 34 sets the head pointer in column 60 of queue 38 to the next parameter. Therefore, scheduler 34 effectively sets the linked list to the next connection indicated by the next parameter. After step 516, flow chart 500 is completed.

At step 506 (FIG. 11A), if data available field 92A for the connection indicates that data is available, scheduler 34 advances to a step 530. At step 530, scheduler 34 determines if field 92D indicates an ABR mode. If so, scheduler 34 advances to a step 532. At step 532, scheduler 34 receives the cell type from ABR manager 44 on control bus 58 and writes the connection information (e.g., the connection number and the type of connection) to schedule FIFO memory 42. After step 532, scheduler 34 advances to a step 534.

At step 534, scheduler 34 determines if the selected priority level in priority queue 38 is equal to the out-of-rate priority parameter in field 92Q. If so, scheduler 34 advances to a step 560 (FIG. 11C). If not, scheduler 34 advances to a step 578 (FIG. 11C).

At step 530, if field 92D indicates that the connection is not an ABR mode, scheduler 34 advances to a step 536 where scheduler 34 writes the connection to schedule FIFO memory 42. At a step 538, scheduler 34 determines whether field 92D indicates an UBR mode. If so, scheduler 34 advances to step 560. If not, scheduler 34 advances to step 578. If scheduler 34 reaches step 560, the connection utilizing the UBR mode of traffic has been written to schedule FIFO memory 42. At step 560, scheduler 34 determines if the selected priority level of levels 64A–G is indicative of a tunnel mode represented by level 64I of queue 38 (Mar. 17, 1998). If so, scheduler 34 clears the tunnel active indication at a step 562 and advances to a step 564. If not, scheduler 34 advances to step 564.

At step 564, scheduler 34 determines if the head pointer in column 60 of queue 38 for the selected priority level is equal to the tail pointer in column 62. If so, flow chart 500 is completed because the circularly linked list consists of only the one connection. If not, scheduler 34 advances to a step 566.

At step 566, scheduler 34 sets the tail pointer in column 62 of queue 38 to the connection (e.g., the head pointer in queue 38) and advances to a step 567. In step 567, scheduler 34 determines if field 92D indicates an ABR mode. If not, scheduler 34 sets the head pointer in queue 38 to the queue pointer in field 92F of connection state 90 for the connection at a step 568. If so, scheduler 34 sets the head pointer in queue 38 to the out-of-rate pointer in field 92Q at a step 570. Steps 566, 568, and 570 rotate the circularly linked list associated with UBR modes so that the next connection is at the head of the list. After steps 568 and 570, flow chart 500 is completed.

When scheduler 34 reaches step 578, scheduler 34 has determined that a VBR or ABR connection has been written to schedule FIFO memory 42. At step 578, scheduler 34 determines whether selected priority level of levels 64A–G is indicative of tunnel transmission mode, represented by level 64H of queue 38 (FIG. 2). If so, scheduler 34 clears tunnel active indication at a step 579 and advances to a step 580. If not, scheduler 34 advances to step 580. At step 580, scheduler 34 determines if the head pointer in queue 38 is equal to the tail pointer. If so, scheduler 34 sets the head pointer in column 60 of queue 38 to null in a step 582. If not, scheduler 34 advances to a step 584 and sets the head pointer to the queue pointer field 92F of connection state 90 for the connection.

After steps 582 and 584, scheduler 34 advances to schedule rate flow chart 600 described with reference to FIGS. 12A–C. When flow chart 600 is completed, flow chart 500 is completed.

Scheduler 34 utilizes schedule rate flow chart 600 to schedule a connection in the future by linking the connection onto a schedule slot of slots 88A–G in dynamic schedule table 88. In this way, scheduler 34 dynamically allocates connections using ABR and VBR modes to maximize the bandwidth of communication system 20. Scheduler 34 utilizes the single bucket and dual bucket scheduling algorithms to appropriately schedule ABR and VBR modes of traffic in slots 88A–G of table 88. Statistical multiplexing can be achieved for VBR and ABR modes of traffic by bursting connections to the extent allowed by L1 and L2 parameters to recover from periods during which the connections were not allowed to be transmitted.

Figure 12A:
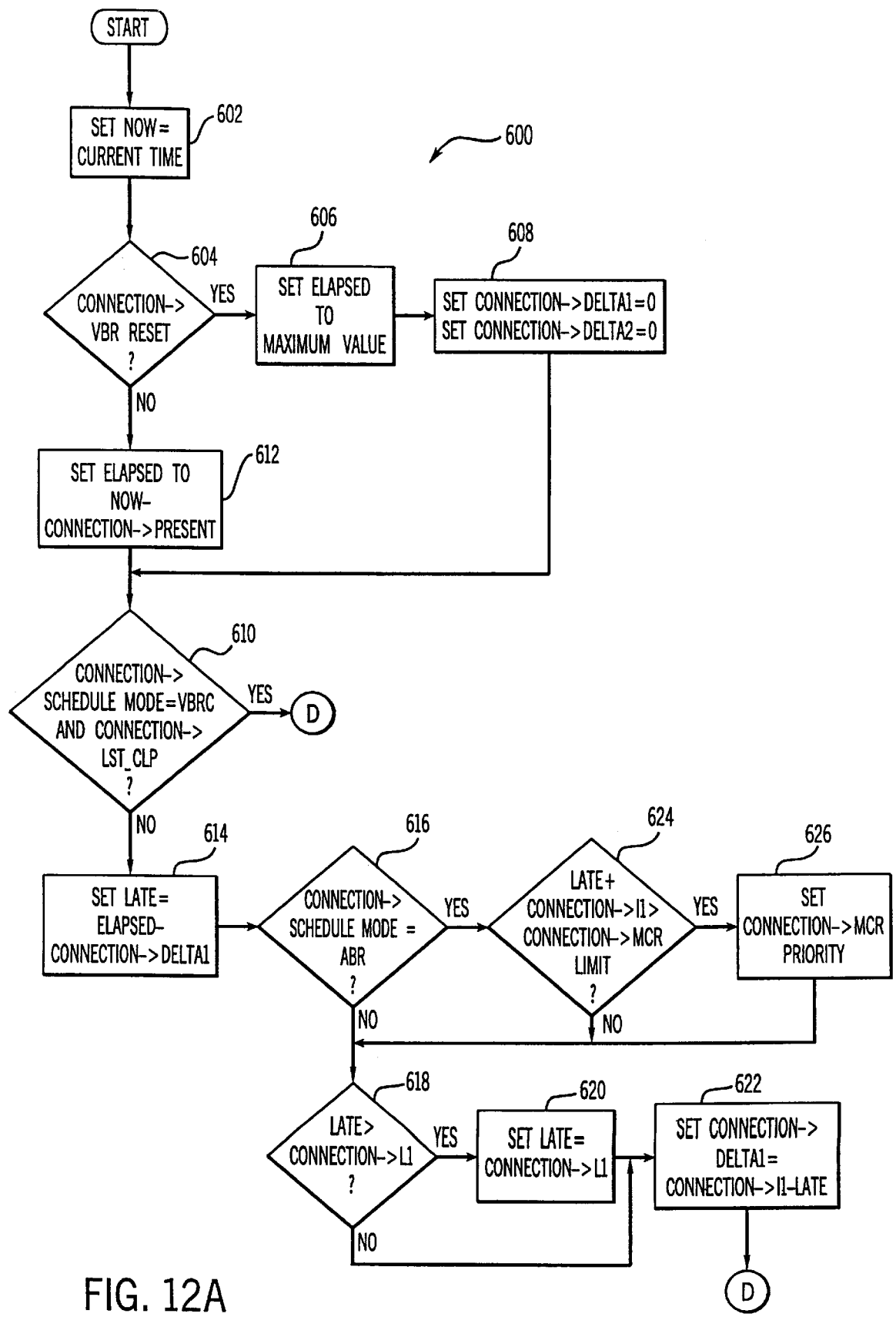
FIGS. 12A–C include a flow chart showing the schedule rate operation illustrated in FIG. 11C.
Figure 12B:
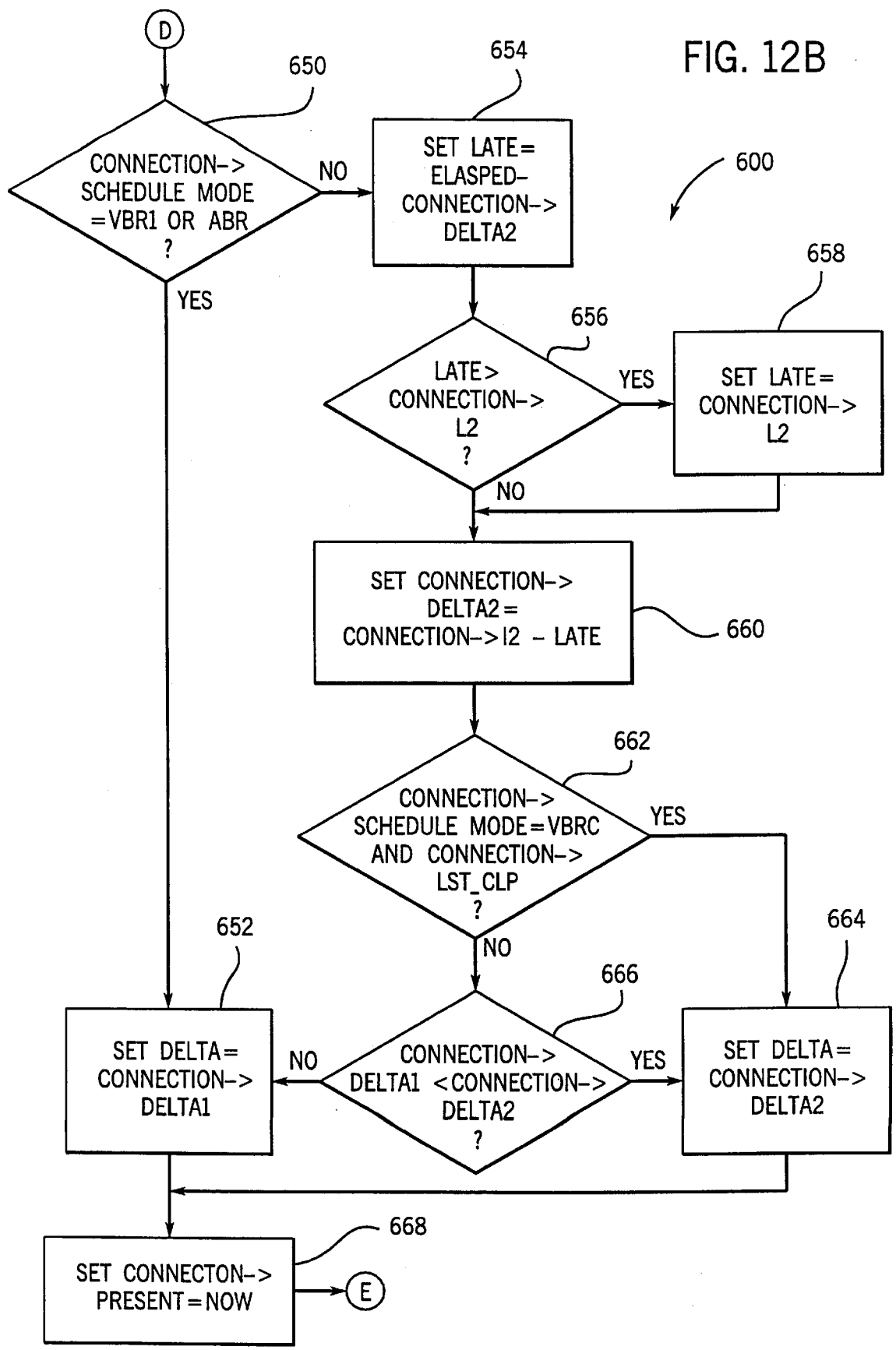
Figure 12C:
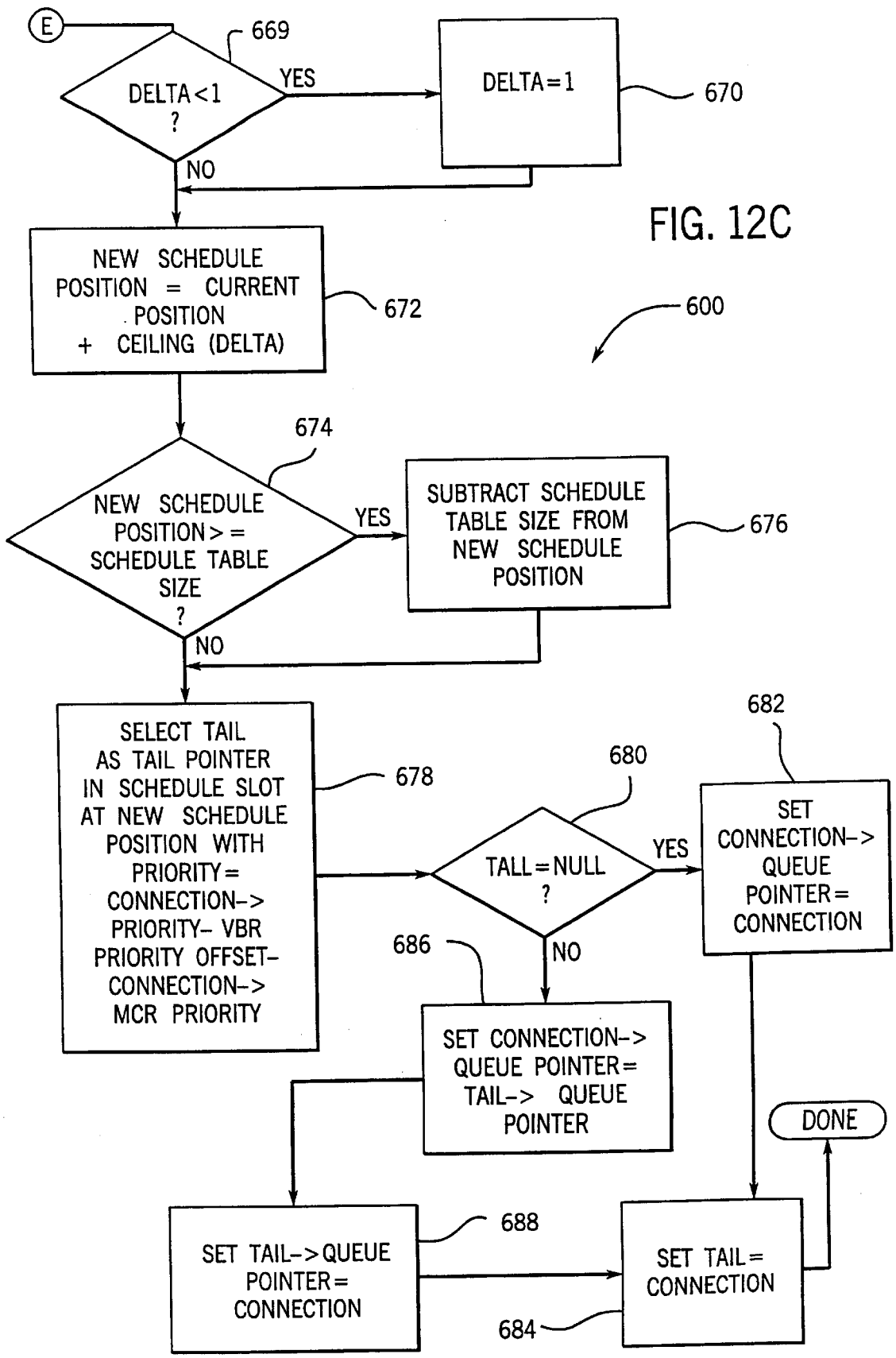

With reference to FIGS. 12A–C, scheduler 34 sets a now parameter equal to the current time provided by timer 36 at a step 602. At a step 604, scheduler 34 determines if VBR reset field 92G of connection state 90 indicates that the delta 1 and delta 2 parameters for the connection should be reset. Resetting the delta 1 and delta 2 parameters sets VBR buckets to their maximum burst state. If so, scheduler 34 advances to a step 606. If not, scheduler 34 advances to a step 612.

At step 606, the elapsed parameter is set to a maximum value. After step 606, scheduler 34 advances to a step 608 and sets the delta 1 parameter in field 92M and the delta 2 parameter in field 92N to zero. After step 608, scheduler 34 advances to a step 610.

At step 612, scheduler 34 sets the elapsed parameter to the now parameter minus the present parameter in field 92L. The elapsed parameter represents the amount of time since the last VBR transmission for the connection. At step 610, scheduler 34 determines if field 92D of connection state 90 indicates a VBRC mode and if CLP field 92B is set. If so, scheduler 34 advances to a step 650 (FIG. 12B) and schedules the connection in accordance with a VBRC bucket algorithm. If not, scheduler 34 advances to a step 614.

At step 614, a late parameter is set equal to the elapsed parameter minus a delta 1 parameter stored in delta 1 field 92M of connection state 90 for the connection. After step 614, scheduler 34 advances to step 616 and determines if field 92D for the connection is set to an ABR mode. If not, scheduler 34 advances to a step 618. If so, scheduler 34 advances to a step 624.

At step 618, scheduler 34 determines if the late parameter is greater than the L1 parameter in L1 field 92I of connection state 90 for the connection. If so, scheduler 34 advances to a step 620 and sets the late parameter equal to the L1 parameter in field 92I. If not, scheduler 34 advances to a step 622. After step 620, scheduler 34 advances to step 622.

At step 624, if the late parameter plus the I1 parameter in field 92H for the connection is greater than the MCR limit parameter in the MCR field 92P, scheduler 34 advances to a step 626. Otherwise, scheduler 34 advances to step 618. At step 624, scheduler 34 sets the MCR priority parameter in field 920. Thus, preferred scheduling can be achieved via the MCR priority parameter and the MCR limit parameter.

At step 622, scheduler 34 sets the delta 1 parameter in field 92M equal to the I1 parameter in field 92H minus the late parameter. After step 622, scheduler 34 advances to step 650 (FIG. 12B). At step 650, scheduler 34 determines if schedule mode field 62C indicates a VBR 1 or an ABR mode. If so, scheduler 34 advances to a step 652 and sets a delta parameter equal to the delta 1 parameter in field 92M. If not, scheduler 34 advances to a step 654 where the late parameter is set equal to the elapsed parameter minus the delta 2 parameter in field 92N.

After step 654, scheduler 34 advances to a step 656 where the late parameter is compared to the L2 parameter stored in field 92K for the connection. If the late parameter is greater than the L2 parameter, scheduler 34 advances to a step 658 where the late parameter is set equal to the L2 parameter in field 92K. After steps 656 and 658, scheduler 34 advances to a step 660.

At step 660, scheduler 34 sets the delta 2 parameter in delta 2 field 92N equal to the I2 parameter in I2 field 92J minus the late parameter. After step 660, scheduler 34 determines if field 92D indicates a VBRC mode and if the last CLP field 92B is set at a step 662. If so, scheduler 34 advances to a step 664 where the delta parameter is set to the delta 2 parameter in field 92N for the connection. If not, scheduler 34 advances to a step 666.

At step 666, scheduler 34 determines if the delta 1 parameter in field 92M is less than the delta 2 parameter in field 92N. If so, scheduler 34 advances to step 664. If not, scheduler 34 advances to step 652.

After steps 652 and 664, scheduler 34 advances to a step 668 where the present parameter in field 92L for the connection is set equal to the now parameter.

After step 668, scheduler 34 determines if the delta parameter is less than one at a step 669 (FIG. 12C). If the delta parameter is less than one, scheduler 34 advances to a step 670 and sets the delta parameter equal to one. After step 670, scheduler 34 advances to a step 672.

If the delta parameter is not less than one at step 669, scheduler 34 advances to step 672. At step 672, scheduler 34 calculates a new schedule position parameter equal to a current position plus the ceiling (delta parameter). The function ceiling (delta parameter) is the lowest integer which is greater than or equal to the delta parameter. The new schedule position refers to a new slot of slots 88A–G.

After step 672, scheduler 34 determines if the new schedule position parameter is greater than or equal to the schedule table size parameter at a step 674. The schedule table size parameter is a user-set parameter which indicates the number of slots 88A–G for dynamic schedule table 88. If so, the new schedule position parameter will not fit within one cycle of the dynamic schedule table 88, and scheduler 34 subtracts the schedule table size parameter from the new schedule position parameter at a step 676. After step 676, scheduler 34 advances to a step 678.

If the new schedule position parameter is less than the schedule table size parameter, scheduler 34 advances from step 674 to step 678. At step 678, scheduler 34 selects a slot tail pointer entry of entries 96A–D in dynamic schedule table 88 for one of slot 88A–G. The priority level of the chosen entry of entries 96A–D is equal to the priority parameter in field 92E minus the VBR priority offset minus the MCR priority parameter in field 92O. Therefore, the priority can be increased in the new schedule slot so that the connection is more likely to be transmitted after the new schedule position has been processed.

After step 678, scheduler 34 determines if the slot tail pointer entry of entries 96A–D is null at a step 680. If so, scheduler 34 sets the queue pointer in field 92F equal to the connection at a step 682. After step 682, scheduler 34 advances to a step 684.

If the slot tail pointer in the selected entry is not null, scheduler 34 advances from step 680 to a step 686 and sets the queue pointer in field 92F equal to the queue pointer in field 92F of connection state 90 pointed to by the slot tail pointer in the selected entry of entries 96A–D. After step 686, scheduler 34 sets the queue pointer in field 92F of connection state 90 for the connection pointed to by the slot tail pointer of the selected entry to the connection. After step 688, scheduler 34 advances to a step 684. At step 684, scheduler 34 sets the slot tail pointer for the selected entry to the connection. After step 684, flow chart 600 is completed.

Alternatively, scheduler 34 can be modified to handle packets of data which are not of fixed size. In flow chart 600, the calculation of the delta parameter can be according to the following equation to handle variable size data packets: delta parameter=(I parameter*next packet size)−Late. This equation is the same as the equation in steps 622 and 660 where the next packet size parameter is equal to one in the fixed packet size case.

It is understood that, while the detailed drawings, specific examples, and particular memory structures given describe a preferred exemplary embodiment of the present invention, they are for the purpose of illustration only. The apparatus and method of the invention is not limited to the precise details and conditions disclosed. For example, although the scheduler is an ATM scheduler, it may be utilized with other communication systems. Also, although particular timing parameters are described, other methods of tracking scheduling times may be utilized. Further still, single lines in the various drawings may represent multiple conductors. Various changes may be made to the details disclosed without departing from the spirit of the invention which is defined by the following claims:

What is claimed is:

1. A traffic manager coupled to a communication system for scheduling transmission of information associated with a plurality of connections in the communication system, the traffic manager comprising:

a schedule table including a plurality of slots, each of the slots having at least one tunnel entry;

a global priority queue having a tunnel level associated with the tunnel entry, the tunnel level defining at least one connection from one of a plurality of service classes; and a scheduler coupled to the schedule table and the global priority queue, the scheduler processing the slot locations and setting the tunnel level active in response to processing the tunnel entry, the scheduler selecting at least one connection from the tunnel level of the global priority queue when the tunnel level is active, whereby the selection of connections from the plurality of service classes allows per connection shaping in the tunnel mode to maximize communication bandwidth.

2. The traffic manager of claim 1, wherein the schedule table and priority queue are located in the same unit.

3. The traffic manager of claim 1, wherein the service classes include a VBR mode or an ABR mode.

4. The traffic manager of claim 1, wherein the service classes include UBR mode.

5. The traffic manager of claim 1, wherein the communication system is an asynchronous transfer mode (ATM) system.

6. The traffic manager of claim 1, wherein the tunnel entry is capable of defining connections from both the VBR and ABR service classes.

7. A traffic manager coupled to a communication system for scheduling transmission of information associated with a plurality of connections in the communication system, the traffic manager comprising:

a schedule table including a plurality of slots, each of the slots having at least one tunnel entry;

a global priority queue having a tunnel level associated with the tunnel entry, the tunnel level defining at least one connection from any of a VBR connection and a ABR connection; and a scheduler coupled to the schedule table and the global priority queue, the scheduler processing the slot locations and setting the tunnel level active in response to processing the tunnel entry, the scheduler selecting at least one connection from the tunnel level of the global priority queue when the tunnel level is active, whereby the selection of connections from any of the VBR connection and the ABR connection allows per connection shaping in the tunnel mode to maximize communication bandwidth.

8. The traffic manager of claim 7, wherein the communication system is an asynchronous transfer mode (ATM) system.

9. The traffic manager of claim 7, wherein the schedule table and priority queue are located in the same unit.

10. A communication system comprising:

a control memory including a global priority queue and a connection state data structure, the global priority queue having a plurality of tunnel levels defining a plurality of connections from a plurality of service classes, the connection state data structure including particular bit rate mode parameters for the connection; and a scheduler coupled to the control memory, the scheduler scheduling a plurality of connections from the plurality of tunnel levels to select a connection for eventual transmission, the scheduler dynamically rescheduling the connection in response to a timing parameter and the particular bit rate mode parameters for the connection.

11. The communication system of claim 10, wherein the plurality of tunnel levels includes a XBR tunnel for transmission of a variety of traffic modes, including ABR and VBR.

12. The communication system of claim 10, wherein the plurality of tunnel levels includes a UBR tunnel for transmission of traffic modes such as UBR which are associated with circularly linked lists.

13. The communication system of claim 10, wherein the particular bit rate mode of traffic is variable bit rate (VBR).

14. The communication system of claim 10, wherein the particular bit rate mode of traffic is unspecified bit rate (UBR).

15. The communication system of claim 13, wherein the scheduler dynamically reschedules in accordance with a single leaky bucket algorithm.

16. The communication system of claim 13, wherein the scheduler dynamically reschedules in accordance with a dual leaky bucket algorithm.

17. The communication system of claim 16, wherein the variable bit rate mode parameters include delta 1, delta 2, L1, L2, I1, and I2 parameters.

18. A method of scheduling connections for transmission on a communication network, the method comprising:

accessing a slot in a schedule table and retrieving connection information associated with a tunnel connection;

placing the connection information in a priority queue having a tunnel level associated with the tunnel connection, the tunnel connection being from one of a plurality of service classes; and processing the tunnel level to communicate information associated with the tunnel connection.

19. The method of claim 18, wherein the communication network is an asynchronous transfer mode (ATM) network.

20. The method of claim 18, wherein the schedule table and priority queue are located in the same unit.

* * * * *